US012322319B2

(12) United States Patent
Meng et al.

(10) Patent No.: US 12,322,319 B2
(45) Date of Patent: Jun. 3, 2025

(54) DISPLAY CONTROL METHOD AND DEVICE, IMAGE PROCESSING DEVICE AND DISPLAY APPARATUS

(71) Applicant: BOE TECHNOLOGY GROUP CO., LTD., Beijing (CN)

(72) Inventors: Zhaohui Meng, Beijing (CN); Lin Cong, Beijing (CN); Xin Duan, Beijing (CN); Yifan Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,103

(22) PCT Filed: Mar. 30, 2022

(86) PCT No.: PCT/CN2022/084092
§ 371 (c)(1),
(2) Date: Mar. 18, 2023

(87) PCT Pub. No.: WO2023/184242
PCT Pub. Date: Oct. 5, 2023

(65) Prior Publication Data
US 2024/0304131 A1 Sep. 12, 2024

(51) Int. Cl.
*G09G 3/20* (2006.01)

(52) U.S. Cl.
CPC ....... *G09G 3/2096* (2013.01); *G09G 2310/04* (2013.01); *G09G 2320/10* (2013.01);
(Continued)

(58) Field of Classification Search
CPC .. G09G 3/2096; G09G 3/3655; G09G 3/3666; G09G 3/20; G09G 3/2007;
(Continued)

(56) References Cited

U.S. PATENT DOCUMENTS 11,881,134 B2 * 1/2024 Jeong .................... H04N 5/144
2014/0002739 A1 1/2014 Kwa et al.
(Continued)

FOREIGN PATENT DOCUMENTS

CN 103403792 A 11/2013
CN 103680382 A 3/2014
(Continued)

*Primary Examiner* — Nitin Patel
*Assistant Examiner* — Amen W Bogale
(74) *Attorney, Agent, or Firm* — HOUTTEMAN LAW LLC

(57) ABSTRACT

The present disclosure provides a display control method and device, an image processing device and display apparatus, and belongs to the technical field of display. The display control method of the present disclosure includes: determining a data stream format according to data streams for the $t^{th}$ frame of image; determining a dynamic region and image data thereof from the data streams for the $t^{th}$ frame of image when the data stream format is a regional transmission format; and transmitting the image data for the dynamic region and/or the image data for the $(t-1)^{th}$ frame of image in the buffer space to the display assembly according to the end-of-transmission identifier in the data streams for the $t^{th}$ frame of image and the configuration command of the $t^{th}$ frame of image, so that the display assembly refreshes the display image.

17 Claims, 7 Drawing Sheets

(52) U.S. Cl.
CPC . *G09G 2340/0435* (2013.01); *G09G 2360/18* (2013.01); *G09G 2370/00* (2013.01)

(58) Field of Classification Search
CPC .... G09G 3/2018; G09G 3/32; G09G 2310/04; G09G 2310/08; G09G 2310/0213; G09G 2320/10; G09G 2320/103; G09G 2330/021; G09G 2340/0435; G09G 2340/0414; G09G 2340/0421; G09G 2340/125; G09G 2360/18; G09G 2360/08; G09G 2360/16; G09G 2370/00; G09G 2370/047; G09G 2370/12; G09G 5/003; G09G 5/006; G09G 5/39; G09G 5/395; G09G 5/399; G09G 5/397; H04N 5/63; G02F 1/133
See application file for complete search history.

(56) References Cited

U.S. PATENT DOCUMENTS

| | | | | |
|---|---|---|---|---|
| 2017/0295343 | A1* | 10/2017 | Konishi | G09G 3/2096 |
| 2019/0057652 | A1* | 2/2019 | Lee | H04N 5/57 |

FOREIGN PATENT DOCUMENTS

| | | | |
|---|---|---|---|
| CN | 104123906 | A | 10/2014 |
| CN | 106782403 | A | 5/2017 |
| CN | 112130790 | A | 12/2020 |
| CN | 113741676 | A | 12/2021 |

* cited by examiner

DISPLAY CONTROL METHOD AND DEVICE, IMAGE PROCESSING DEVICE AND DISPLAY APPARATUS

TECHNICAL FIELD

The present disclosure relates to the technical field of display, and in particular, to a display control method and device, an image processing device, a display apparatus, an electronic device, and a computer readable medium.

BACKGROUND

In the field of display technology, when a screen of a display apparatus displays new content, the pixels need to be refreshed, and the process of refreshing all pixels of the screen each time is called one "refresh". The refresh rate refers to the frequency at which the screen is updated or refreshed, and is typically measured in hertz (Hz). Manufacturers use the refresh rate to emphasize a smooth user experience. In recent years, a high refresh rate has been a popular challenge for display technology, and many manufacturers have regarded the high refresh rate as one of the main selling points of high display quality.

SUMMARY

In order to solve at least one of the technical problems existing in the relevant art, a display control method and device, an image processing device, a display apparatus, an electronic device, and a computer readable medium are provided in the present disclosure.

As a first aspect, an embodiment of the present disclosure provides a display control method for a display control device of a display apparatus, the method includes: determining a data stream format of a tth frame of image according to received data streams for the $t^{th}$ frame of image, wherein the data stream format comprises an entire frame transmission format and a regional transmission format, the entire frame transmission format is used for transmitting data for entire frame of image, and the regional transmission format is used for transmitting image data for a dynamic region with refreshed content, t being an integer greater than 1; determining the dynamic region and the image data for the dynamic region in the $t^{th}$ frame of image from the received data streams for the $t^{th}$ frame of image in response to that the data stream format of the $t^{th}$ frame of image is the regional transmission format, wherein the $t^{th}$ frame of image further includes a static region in addition to the dynamic region; and transmitting the image data for the dynamic region in the $t^{th}$ frame of image and/or image data for a $(t-1)^{th}$ frame of image in a buffer space of the display control device to a display assembly of the display apparatus according to an end-of-transmission identifier in the data streams for the $t^{th}$ frame of image and a configuration command of the $t^{th}$ frame of image, so that the display assembly refreshes the display image.

In some embodiments, the end-of-transmission identifier includes a regional end-of-transmission identifier and an entire frame end-of-transmission identifier. The regional end-of-transmission identifier indicates that transmission of the image data for the dynamic region in the $t^{th}$ frame of image is finished, and the entire frame end-of-transmission identifier indicates that transmission of image data for the $t^{th}$ frame of image is finished. Transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, includes: transmitting the image data for the dynamic region in the $t^{th}$ frame of image and the image data for the static region in the $(t-1)^{th}$ frame of image in to the display assembly of the display apparatus in response to that the entire frame end-of-transmission identifier in the data streams for the $t^{th}$ frame of image is received and a corresponding configuration command indicates refresh of the entire frame of image, so that the display assembly refreshes an entire frame of display image.

In some embodiments, the end-of-transmission identifier includes a regional end-of-transmission identifier and an entire frame end-of-transmission identifier. The regional end-of-transmission identifier indicates that transmission of the image data for the dynamic region in the $t^{th}$ frame of image is finished, and the entire frame end-of-transmission identifier indicates that transmission of image data for the $t^{th}$ frame of image is finished. Transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, includes: transmitting the image data of the dynamic region in the $t^{th}$ frame of image to the display assembly of the display apparatus in response to that the entire frame end-of-transmission identifier in the data streams for the $t^{th}$ frame of image is received and a corresponding configuration command indicates refresh of the dynamic region, so that the display assembly refreshes the display image in the dynamic region.

In some embodiments, the display control method further includes: determining the data for the entire frame of image for the $t^{th}$ frame of image from received multiple image data streams for the $t^{th}$ frame of image in response to that the data transmission format of the $t^{th}$ frame of image is the entire frame transmission format; and transmitting the data for the entire frame of image for the $t^{th}$ frame of image to the display assembly of the display apparatus in response to that the entire frame end-of-transmission identifier in the data streams for the $t^{th}$ frame of image is received and a corresponding configuration command indicates refresh of the entire frame of image, so that the display assembly refreshes an entire frame of display image.

In some embodiments, the end-of-transmission identifier includes a regional end-of-transmission identifier and an entire frame end-of-transmission identifier. The regional end-of-transmission identifier indicates that transmission of the image data for the dynamic region in the $t^{th}$ frame of image is finished, and the entire frame end-of-transmission identifier indicates that transmission of image data for the $t^{th}$ frame of image is finished. Transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, includes transmitting the image data for the dynamic region in the $t^{th}$ frame of image to the display assembly of the display apparatus in response to that the regional end-of-transmission identifier in the data streams for the $t^{th}$ frame of image is received and a corresponding configuration command indicates refresh of the dynamic region, so that the display assembly refreshes the display image in the dynamic region; and transmitting the image data for the static region in the $(t-1)^{th}$ frame of image to the display assembly of the display apparatus in response to that the entire frame end-of-transmission identifier in the data streams for the $t^{th}$ frame of image is received and a corresponding configuration command indicates refresh of the static region, so that the display assembly refreshes the display image in the static region. The multiple image data streams for the $t^{th}$ frame of image includes at least one regional end-of-transmission identifier.

In some embodiments, the end-of-transmission identifier includes a regional end-of-transmission identifier and an entire frame end-of-transmission identifier. The regional end-of-transmission identifier indicates that transmission of the image data for the dynamic region in the $t^{th}$ frame of image is finished, and the entire frame end-of-transmission identifier indicates that transmission of image data for the $t^{th}$ frame of image is finished. Transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, includes: transmitting the image data for the dynamic region in the $t^{th}$ frame of image and the image data for the static region in the $(t-1)^{th}$ frame of image to the display assembly of the display apparatus in response to that the regional end-of-transmission identifier in the data streams for the $t^{th}$ frame of image is received and a corresponding configuration command indicates refresh of the entire frame of image, so that the display assembly refreshes an entire frame of display image. The multiple image data streams for the $t^{th}$ frame of image includes at least one regional end-of-transmission identifier.

In some embodiments, determining the dynamic region and the image data for the dynamic region in the $t^{th}$ frame of image from the received data streams for the $t^{th}$ frame of image, includes determining initial coordinates and a size of the dynamic region in the $t^{th}$ frame of image according to a start-of-capture command in the data streams for the $t^{th}$ frame of image; capturing image data from multiple image data streams following the start-of-capture command in response to the start-of-capture command; and determining the captured image data as the image data for the dynamic region in the $t^{th}$ frame of image in response to an end-of-capture command in the data streams for the $t^{th}$ frame of image.

In some embodiments, the display control method further includes: refreshing the image data for the dynamic region in the $(t-1)^{th}$ frame of image in the buffer space based on the image data for the dynamic region in the $t^{th}$ frame of image, so that data for the entire frame of image for the $t^{th}$ frame of image is cached in the buffer space.

As a second aspect, an embodiment of the present disclosure provides a display control method for an image processing device of a display apparatus, the display control method includes: determining a dynamic region with refreshed content and a static region without refreshed content in a $t^{th}$ frame of image according to image data for the $t^{th}$ frame of image and image data for a $(t-1)^{th}$ frame of image, t being an integer larger than 1; determining that a data stream format of the $t^{th}$ frame of image is a regional transmission format in response to that the dynamic region is a local region in the $t^{th}$ frame of image, wherein the data stream format comprises an entire frame transmission format and a regional transmission format, the entire frame transmission format is used for transmitting data for entire frame of image, and the regional transmission format is used for transmitting image data for the dynamic region; generating data streams for the $t^{th}$ frame of image in the regional transmission format according to image data for the dynamic region in the $t^{th}$ frame of image; and transmitting the data streams for the $t^{th}$ frame of image to a display control device of the display apparatus, so that the display control device controls a display assembly of the display apparatus to display the $t^{th}$ frame of image.

In some embodiments, generating the data streams for the $t^{th}$ frame of image in the regional transmission format according to the image data for the dynamic region in the $t^{th}$ frame of image, includes: generating a start-of-transmission data stream for the $t^{th}$ frame of image, wherein the start-of-transmission data stream includes a start-of-capture command, and the start-of-capture command comprises initial coordinates and a size of the dynamic region in the $t^{th}$ frame of image; the display control device determines a position of the dynamic region and starts capturing image data in the data streams according to the start-of-capture command; generating multiple image data streams in the regional transmission format according to the image data for the dynamic region in the $t^{th}$ frame of image; and generating an end-of-transmission data stream for the $t^{th}$ frame of image, wherein the end-of-transmission data stream comprises an end-of-capture command, and the display control device stops capturing the image data in the data streams and determines the captured image data as the image data for the dynamic region in the $t^{th}$ frame of image, according to the end-of-capture command.

In some embodiments, transmitting the data streams for the $t^{th}$ frame of image to the display control device of the display apparatus, includes: transmitting the data streams for the $t^{th}$ frame of image to the display control device for multiple times during a time period corresponding to the $t^{th}$ frame of image.

In some embodiments, the data streams for the $t^{th}$ frame of image includes an end-of-transmission identifier, and the end-of-transmission identifier includes a regional end-of-transmission identifier and an entire frame end-of-transmission identifier. The regional end-of-transmission identifier indicates that transmission of the image data for the dynamic region in the $t^{th}$ frame of image is finished, and the entire frame end-of-transmission identifier indicates that transmission of image data for the $t^{th}$ frame of image is finished. The data streams for the $t^{th}$ frame of image includes a configuration command having a start-of-capture command and an end-of-capture command, the configuration command indicates a data stream format of the $t^{th}$ frame of image and instructes the display control device to control the display assembly to refresh a display image in the dynamic region and/or a display image in the static region in the $t^{th}$ frame of image.

In some embodiments, the image processing device includes a Graphics Processing Unit (GPU), and the display control device includes a timing controller (Tcon).

As a third aspect, an embodiment of the present disclosure provides a display apparatus including an image processing device, a display control device and a display assembly. The image processing device is connected to the display control device and configured to render a $t^{th}$ frame of image to be displayed, determine a dynamic region with refreshed content and a static region without refreshed content in the $t^{th}$ frame of image, generate data streams for the $t^{th}$ frame of image according to the dynamic region, and transmit the data streams to the display control device, t being an integer greater than 1. The display control device is connected to the display assembly and configured to receive the data streams for the $t^{th}$ frame of image, determine image data for the dynamic region in the $t^{th}$ frame of image, and transmit the image data for the dynamic region in the $t^{th}$ frame of image and/or the cached image data for the static region in a $(t-1)^{th}$ frame of image to the display assembly according to an end-of-transmission identifier and a configuration command in the data streams. The display assembly is configured to refresh a display image according to the image data transmitted by the display control device.

As a fourth aspect, an embodiment of the present disclosure provides a display control device including a format determination module, an image data determination module, and a data transmission module. The format determination module is configured to determine a data stream format of a $t^{th}$ frame of image according to received data streams for the $t^{th}$ frame of image, wherein the data stream format comprises an entire frame transmission format and a regional transmission format, the entire frame transmission format is used for transmitting data for entire frame of image, and the regional transmission format is used for transmitting image data for a dynamic region with refreshed content, t being an integer larger than 1. The image data determination module is configured to determine the dynamic region and image data for the dynamic region in the $t^{th}$ frame of image according to the received data streams for the $t^{th}$ frame of image in response to that the data stream format of the $t^{th}$ frame of image is the regional transmission format, where the $t^{th}$ frame of image further comprises a static region in addition to the dynamic region. The data transmission module is configured to transmit the image data for the dynamic region in the $t^{th}$ frame of image and/or image data for a $(t-1)^{th}$ frame of image in a buffer space of the display control device to a display assembly of a display apparatus according to an end-of-transmission identifier in the data streams for the $t^{th}$ frame of image and a configuration command of the $t^{th}$ frame of image, so that the display assembly refreshes a display image.

As a fifth aspect, an embodiment of the present disclosure provides an image processing device including a region determination module, a transmission format determination module, a data stream generation module, and a data stream transmission module. The region determination module is configured to determine a dynamic region with refreshed content and a static region without refreshed content in a $t^{th}$ frame of image according to a rendered image data for the $t^{th}$ frame of image and image data for a $(t-1)^{th}$ frame of image, t being an integer larger than 1. The transmission format determination module is configured to determine that a data stream format of the $t^{th}$ frame of image is a regional transmission format in response to that the dynamic region is a local region in the $t^{th}$ frame of image, wherein the data stream format comprises an entire frame transmission format and a regional transmission format, the entire frame transmission format is used for transmitting data for entire frame of image, and the regional transmission format is used for transmitting image data for the dynamic region. The data stream generation module is configured to generate data streams for the $t^{th}$ frame of image in the regional transmission format according to the image data of the dynamic region in the $t^{th}$ frame of image. The data stream transmission module is configured to transmit the data streams for the $t^{th}$ frame of image to a display control device of a display apparatus, so that the display control device controls a display assembly of the display apparatus to display the $t^{th}$ frame of image.

As a sixth aspect, an embodiment of the present disclosure provides an electronic device, including: a processor; a memory for storing one or more programs; the one or more programs, which, when being run by the processor, is configured to cause the processor to perform the display control method described above.

As a seventh aspect, an embodiment of the present disclosure provides a non-transitory computer-readable storage medium, storing a computer program which, when being run by a processor of a controller, is configured to cause the processor to perform the display control method described above.

DETAIL DESCRIPTION OF EMBODIMENTS

Figure 1:
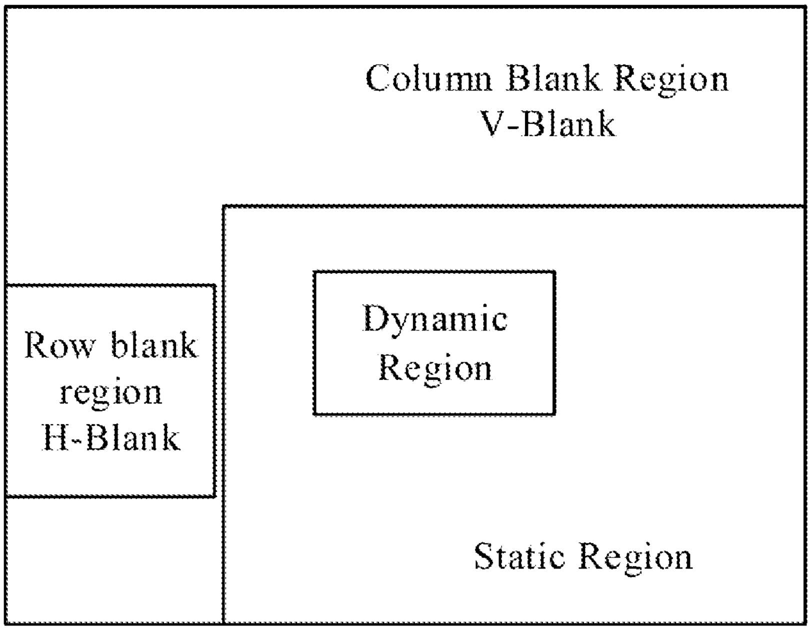
FIG. 1 is a schematic diagram of regional refresh according to an embodiment of the present disclosure.

In order that those skilled in the art will better understand the technical solutions of the present disclosure, the following detailed description will be illustrated in combination the accompanying drawings and the specific embodiments.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "include" or "comprise", and the like, means that the element or item preceding the word comprises the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

In the field of display technology, the refresh rate of the screen of the display apparatus has gradually increased from 60 HZ to 120 HZ/144 HZ or even higher. In the related art, a video card generally renders an entire frame of data and outputs the entire frame of data at a high frequency, thereby achieving a high refresh rate of the screen.

However, due to the influence of the signal transmission bandwidth and the receiving capability of the data frame receiving chip, the high refresh rate causes great pressure on the IC hardware. In addition, the power consumption for achieving a high refresh rate is also amazing.

According to the display control method in an embodiment of the present disclosure, a dynamic region with refreshed content in each frame of image is determined; only image data for the dynamic region is transmitted; an end-of-transmission identifier indicating the end of transmission is included in a data stream for an image; and the regional refresh or entire frame refresh of the image is realized based on a configuration command, thereby reducing the amount of transmitted data, decreasing the power consumption of a display apparatus under a normal refresh rate, or significantly improving the refresh rate without increasing the amount of transmitted data.

According to an embodiment of the present disclosure, a display apparatus may include an image processing device, a display control device, and a display assembly. The image processing device is a transmission terminal for transmitting display data. For example, The image processing device is a graphics processing unit (GPU) configured to render an image, determine a dynamic region in which the content is refreshed and a static region in which the content is not refreshed in the image, generate data streams for the image, and transmit the data streams to the display control device. The display control device is a receiving terminal for receiving display data. For example, the display control device is a timing controller Tcon configured to receive the data streams for the image, obtain and transmit the image data to the display assembly according to an end-of-transmission identifier and the configuration command in the data streams. The display assembly is, for example, a display panel for performing regional refresh or entire frame refresh operation according to input image data. The present disclosure does not limit the types of the devices in the display apparatus.

In some embodiments, after the data transmission of the first frame of image between the image processing device and the display control device, the display control device buffers the data for the first frame of image into a buffer space (e.g., the remote frame buffer RFB) of the display control device. The corresponding image data for the static region in the image after the first frame of image can be directly called from the buffer space.

In some embodiments, for another frame of image after the first frame of image (i.e., a $t^{th}$ frame of image, t is an integer greater than 1), the image processing device may determine a dynamic region in which the content is refreshed and a static region in which the content is not refreshed in the $t^{th}$ frame of image when the image processing device performs an image rendering operation. If the dynamic region is a local region in the $t^{th}$ frame of image, the data stream format for the $t^{th}$ frame of image is a regional transmission format. The data stream format includes an entire frame transmission format and a regional transmission format. The entire frame transmission format is used for transmitting data for the entire frame of image, and the regional transmission format is used for transmitting image data for the dynamic region.

Table 1 and Table 2 show data stream formats for entire frame transmission and regional transmission, respectively, according to an embodiment of the present disclosure. Table 1 and Table 2 are each a row of data streams.

TABLE 1

| BS | VB-ID | Mivd | Maud | Dummy symbols | SS | CTL | SE | Dummy symbols | BE | Pixel1~ PixelN | FS | Dummy symbols | PixelN + 1~Pixel2N | FS | Dummy symbols | FE | VBP |
|---|---|---|---|---|---|---|---|---|---|---|---|---|---|---|---|---|---|

TABLE 2

| BS | VB-ID | Mivd | Maud | Dummy symbols | SS | CTL | SE | Dummy symbols | BE | Pixel1~ PixelN | AS | Dummy symbols | FE | PixelN + 1~Pixel2N | AS | VBP |
|---|---|---|---|---|---|---|---|---|---|---|---|---|---|---|---|---|

The meanings for the nouns in Table 1 and Table 2 are as follows: BS: starting of a blank region; VB-ID: video signal identity; Mvid: video data set; Maud: audio data set; VSC: video data stream configuration; Dummy symbols: blank signal; SS: signal starting; CTL: control signal; SE: signal ending; BE: ending of a blank region; FS: filling start; FE: filling ending; pixel 1~Pixel N: display data for a $1^{st}$ pixel to an $N^{th}$ pixel; pixel N+1~Pixel 2N: display data for a $(N+1)^{st}$ pixel to an $(2N)^{th}$ pixel; AS: regional end-of-transmission identifier; and VBP: entire frame end-of-transmission identifier.

The number N of pixels in each pixel segment may be determined according to hardware support, for example, N=100. The number of pixel segments shown in Tables 1 and 2 is 2, but it should be understood that for each row of the data stream, the number of pixel segments can be determined based on the actual number of pixels to be transmitted. The present disclosure does not limit the number of pixel segments and the specific value of the number of pixels N in each pixel segment.

Under the entire frame transmission format, the image processing device may generate a plurality rows of data streams according to the format shown in Table 1 and transmit the data for the entire frame of image to the display control device; under the regional transmission format, the image processing device may generate a plurality rows of data streams according to the format shown in Table 2, and transmit image data for a dynamic region to the display control device.

FIG. 1 is a schematic diagram showing regional refresh according to an embodiment of the present disclosure. As shown in FIG. 1, A V-Blank (column blank region) interval is between every two frames as a data adjustment region between frames, and the filling of blank data and the configuration of the next frame (i.e., a $t^{th}$ frame) can be implemented during the V-Blank interval. A VBE (ending of the column blank region) signal indicating the ending of the V-Blank interval needs to be inserted at the end of the V-Blank interval and serves as an identifier for the starting of the next frame.

In some embodiments, the next frame (i.e., the $t^{th}$ frame) is transmitted in a way of multiple data streams. HBS (the starting of the row blank region) and HBE (the ending of the row blank region) are required at the beginning of each of the multiple rows to define whether the row blank region is required to be filled with data. The configuration command (VSC) is transmitted in the first row and the last row of the multiple rows, and the configuration command (VSC) includes X and Y coordinates of the starting position of the dynamic region and the size (i.e., a width W and a height H) of the dynamic region, and further includes information such as the refresh mode and refresh timing of the $t^{th}$ frame.

Figure 2:
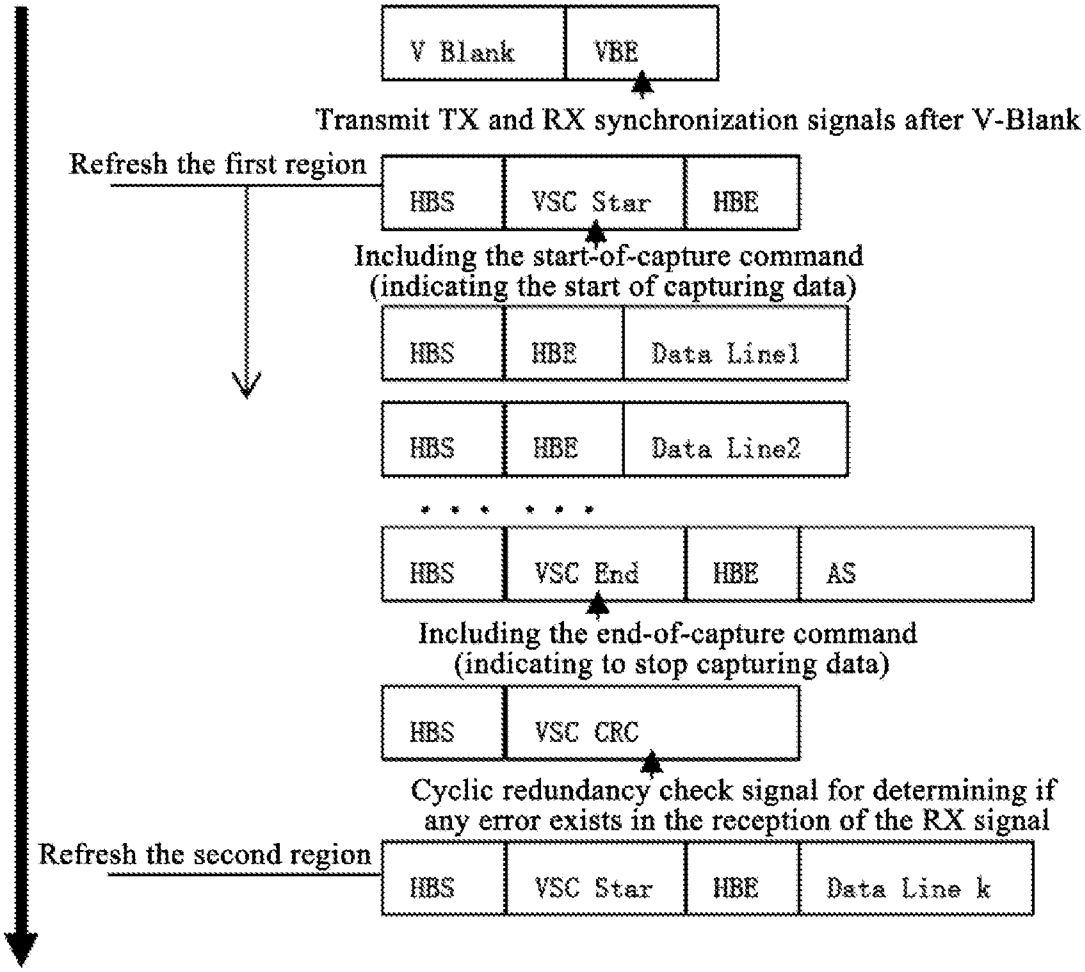
FIG. 2 is a schematic diagram showing a data structure of image data streams according to an embodiment of the present disclosure.

FIG. 2 is a schematic diagram showing a data structure of image data streams according to an embodiment of the present disclosure. As shown in FIG. 2, the image data streams are preceded by a data stream for the blank regions including the column blank region V-Blank and VBE indicating the ending of the column blank region. TX (i.e., data transmission) and RX (i.e., data reception) synchronization signals may be transmitted at the end of V-Blank, so as to achieve synchronization of transmission and reception between the image processing device and the display control device.

In some embodiments, HBS (i.e., the starting of the row blank region) and HBE (i.e., the ending of the row blank region) are required at the beginning of each of the multiple rows to define whether the row blank region is required to be filled with data. The first row is a start-of-transmission data stream and includes a start-of-capture command VSC Star which includes initial coordinates and a size of the dynamic region. According to the start-of-capture command VSC Star, the display control device determines the location of the dynamic region and starts capturing image data in the data streams.

In some embodiments, the start-of-transmission data stream is followed by multiple image data streams for sequentially transmitting image data of rows in the dynamic region, that is Data Line 1, Data Line 2, etc, and the format of the image data is as shown in Table 2. After the transmission of the image data for the dynamic region is finished, the last row is to an end-of-transmission data stream which includes an end-of-capture command VSC End and a regional end-of-transmission identifier AS (also referred to an identifier beacon), wherein the display control device stops capturing the image data in the data streams according to the end-of-capture command VSC End, and the regional end-of-transmission identifier AS indicates that the transmission of the image data for the dynamic region is finished.

In some embodiments, the start-of-capture command and/or the end-of-capture command may further include information such as a refresh mode and a refresh timing of the $t^{th}$ frame, so that the display control device performs the regional refresh or the entire frame refresh operation.

In some embodiments, the end-of-transmission data stream may further include a row of check data stream, which includes a cyclic redundancy check signal VSC CRC for determining if any error exists in the reception of the RX signal.

In some embodiments, as shown in FIG. 2, if an image includes a plurality of dynamic regions, after the image data for a first dynamic region is transmitted, the image data (i.e., Data Line k) for a second dynamic region may be transmitted in sequence until the transmission of the image data for all the dynamic regions is completed.

In this way, the transmission of image data for the dynamic region can be realized.

According to an embodiment of the present disclosure, a display control method is provided, which is applied to a display control device of a display apparatus which is a receiving terminal of the display data, for example, a timing controller Tcon, or in other types, and the present disclosure is not limited thereto.

Figure 3:
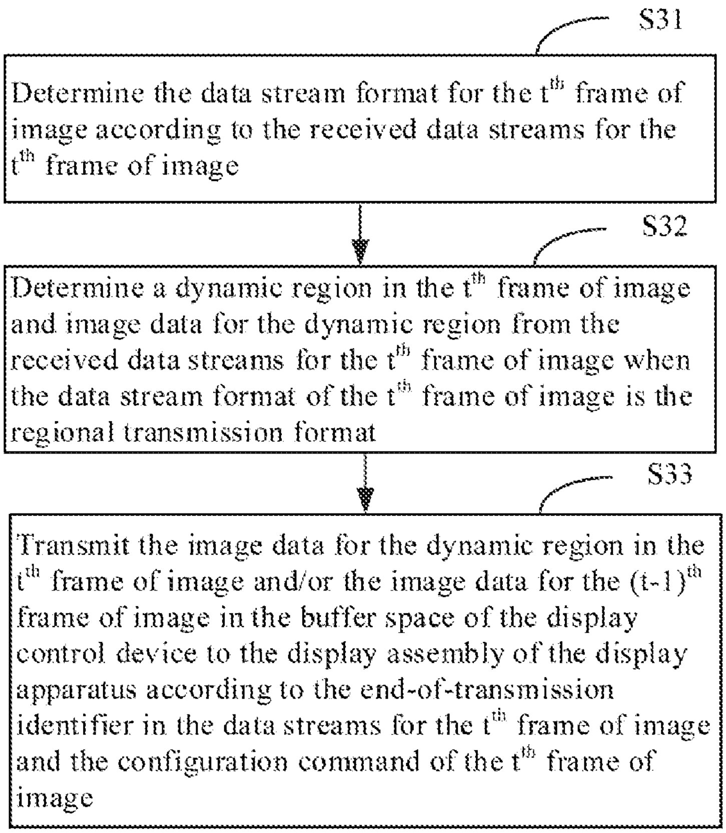
FIG. 3 is a flowchart of a display control method according to an embodiment of the present disclosure.

FIG. 3 is a flowchart of a display control method according to an embodiment of the present disclosure. As shown in FIG. 3, the method includes steps S31 to S33.

At step S31, according to the received data streams for the $t^{th}$ frame of image, the data stream format for the $t^{th}$ frame of image is determined. The data stream format includes an entire frame transmission format and a regional transmission format. The entire frame transmission format is used for transmitting the data for the entire frame of image, and the regional transmission format is used for transmitting image data of a dynamic region with refreshed content, and t is an integer larger than 1.

At step S32, when the data stream format of the $t^{th}$ frame of image is the regional transmission format, a dynamic region in the $t^{th}$ frame of image and image data for the dynamic region are determined from the received data streams for the $t^{th}$ frame of image. In addition to the dynamic region, the $t^{th}$ frame of image further includes a static region.

At step S33, according to the end-of-transmission identifier in the data streams for the $t^{th}$ frame of image and the configuration command of the $t^{th}$ frame of image, the image data for the dynamic region in the $t^{th}$ frame of image and/or the image data for the $(t-1)^{th}$ frame of image in the buffer space of the display control device is transmitted to the display assembly of the display apparatus, so that the display assembly refreshes the display image.

For example, the first frame of image transmitted between the image processing device and the display control device is an entire frame of image, and the display control device buffers the data for the first frame of image into the buffer space of the display control device.

In some embodiments, for any frame of image (i.e., a $t^{th}$ frame of image) after the first frame of image, the image processing device may determine a dynamic region with updated content and a static region without updated content in the $t^{th}$ frame of image according to a difference between the $t^{th}$ frame of image and the $(t-1)^{th}$ frame of image; and in turn transmit the image data for the dynamic region through the regional transmission format.

In some embodiments, the display control device may determine the data stream format of the $t^{th}$ frame of image upon receiving the data stream for the $t^{th}$ frame of image. The data stream format may be determined according to configuration information in the column blank region V-Blank: or the data stream format may be determined according to the start-of-capture command VSC Star in the start-of-transmission data stream, and the determination of the data stream format is not limited by the present disclosure.

In some embodiments, if the $t^{th}$ frame of image is transmitted in the regional transmission format, at step S32 a dynamic region and the image data for the dynamic region in the $t^{th}$ frame of image may be determined from the received data streams for the $t^{th}$ frame of image. That is, a position of the dynamic region is determined according to the initial coordinates and the size of the dynamic region in the start-of-capture command VSC Star of the start-of-transmission data stream; and the image data for the dynamic region is captured from multiple image data streams (which possibly include the start-of-transmission data stream) after the start-of-transmission data stream.

In some embodiments, if an end-of-transmission identifier, such as the regional end-of-transmission identifier AS and/or the entire frame end-of-transmission identifier VBP, in the data streams for the $t^{th}$ frame of image is received, it is determined that the transmission of the image data for the dynamic region in the $t^{th}$ frame of image is finished or the transmission of the image data for the $t^{th}$ frame of image is finished. At step S33, the image data for the dynamic region in the $t^{th}$ frame of image and/or the image data for the $(t-1)^{th}$ frame of image in the buffer space of the display control device are transmitted to the display assembly according to the refresh mode and the refresh timing in the configuration command, so as to realize the regional refresh or entire frame refresh. The refresh timing can be synchronized with the timing when the end-of-transmission identifier is received or after the timing when the end-of-transmission identifier is received, the refresh mode and the refresh timing are not limited by the present disclosure.

In some embodiments, the configuration command may include a start-of-capture command and an end-of-capture command, and the refresh mode and the refresh timing may be in the codes of the start-of-capture command and/or the end-of-capture command, which are not limited by the present disclosure.

In some embodiments, the refresh mode in the configuration command may include refreshing each of the dynamic region and the static region based on a time axis of the entire frame end-of-transmission identifier VBP of each frame. In this case, after the entire frame end-of-transmission identifier VBP is received, the image data for the dynamic region in the $t^{th}$ frame of image and the image data for the static region in the $(t-1)^{th}$ frame of image in the buffer space are transmitted to the display assembly based on the refresh timing in the configuration command, thereby performing the entire frame refresh operation. Such a refresh mode may decrease the amount of data to be transmitted.

In some embodiments, the refresh mod may include refreshing the dynamic region after the regional end-of-transmission identifier AS is received, and refreshing the static region after the entire frame end-of-transmission identifier VBP is received. In this case, after the regional end-of-transmission identifier AS is received, the image data for the dynamic region in the $t^{th}$ frame of image may be transmitted to the display assembly based on the refresh timing in the configuration command, thereby performing the regional refresh operation on the dynamic region. After the entire frame end-of-transmission identifier VBP is received, the image data for the static region in the $(t-1)^{th}$ frame of image in the buffer space is transmitted to the display assembly based on the refresh timing in the configuration command, thereby performing the regional refresh operation on the static region. Such a refresh mode can increase the refresh rate of the dynamic region to improve the display effect of the dynamic region, or decrease the refresh rate of the static region to reduce the power consumption.

In some embodiments, after the transmission of the data streams for the $t^{th}$ frame of image are finished and the regional refresh operation or the entire frame refresh operation is performed on the $t^{th}$ frame of image, the transmission link between the image processing device and the display control device may keep an active, standby or sleep state, until the regional transmission or the entire frame transmission for the $(t+1)^{th}$ frame of image starts. The present disclosure does not limit the status of the transmission link after the transmission is finished.

According to the embodiment of the present disclosure, the data stream format is determined according to the data stream; the dynamic region and image data for the dynamic region is determined under a regional transmission format; and the image data is transmitted to the display assembly according to the end-of-transmission identifier and the configuration command to realize the regional refresh or entire frame refresh of the display image, thereby decreasing the data amount to be transmitted, so that the power consumption of the display apparatus under the normal refresh rate can be reduced, or the refresh rate can be significantly improved without increasing the data amount to be transmitted.

A display control method according to an embodiment of the present disclosure will be described below.

As described above, the image processing device may transmit the data streams having the data structure in FIG. 2 to the display control device. When the display control device receives the data streams, the data stream format of the $t^{th}$ frame of image is determined at step S31. When the data stream format is the regional transmission format, at step S32, the dynamic region and the image data for the dynamic region in the $t^{th}$ frame of image are determined from the received data streams for the $t^{th}$ frame of image.

Figure 4:
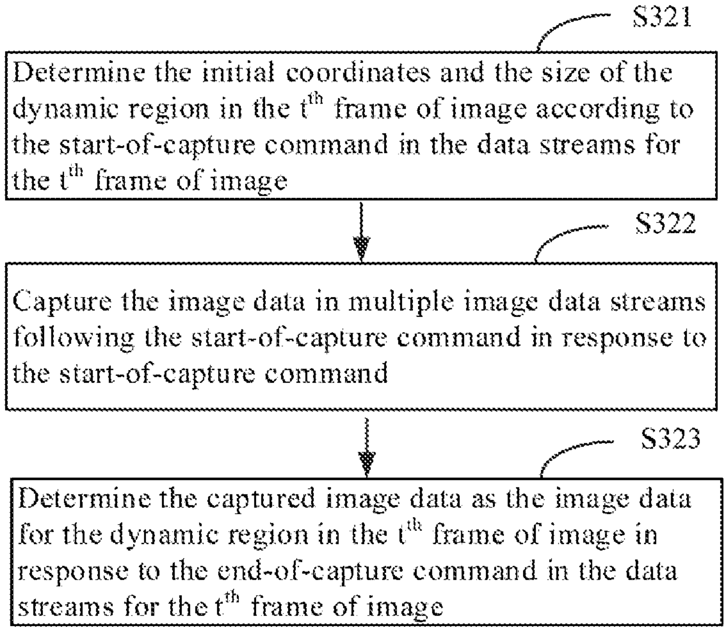
FIG. 4 is a flowchart of a part of steps of a display control method according to an embodiment of the present disclosure.

FIG. 4 is a flowchart of a part of steps of a display control method according to an embodiment of the present disclosure. As shown in FIG. 4, in some embodiments, step S32 may include steps S321 to S323.

At step S321, the initial coordinates and the size of the dynamic region in the $t^{th}$ frame of image are determined according to the start-of-capture command in the data streams for the $t^{th}$ frame of image;

At step S322, in response to the start-of-capture command, the image data in multiple image data streams following the start-of-capture command are captured.

At step S323, in response to the end-of-capture command in the data streams for the $t^{th}$ frame of image, the captured image data is determined as the image data for the dynamic region in the $t^{th}$ frame of image.

That is, referring to the data structure shown in FIG. 2, upon receiving the start-of-transmission data stream (HBS, VSC Star, HBE), the initial coordinates (i.e., X and Y coordinates) and the size (i.e., the width and height) of the dynamic region in the start-of-capture command VSC Star can be determined at step S321; and in response to the start-of-capture command, image data in the multiple image data streams (e.g., HBS, HBE, Data Line 1; HBS, HBE, Data Line 2) after the start-of-capture command may be captured at step S322. The multiple image data streams may also include the start-of-transmission data stream itself, such as HBS, VSC Star, HBE, Data Line k in FIG. 2.

In some embodiments, when the end-of-transmission data stream (HBS, VSC End, HBE, AS; HBS, VSC CRC) is received, at step S323 the data capture process is finished according to the end-of-capture command VSC End in the end-of-transmission stream; and the captured image data is determined as the image data for the dynamic region in the $t^{th}$ frame of image In some embodiments, if a frame of image has a plurality of dynamic regions, the above-described steps S321 to S323 may be repeated for a plurality of times until image data for all of the dynamic regions is obtained.

In this way, the dynamic region and the image data for the dynamic region may be determined so as to perform subsequent processes according to the dynamic region and the image data thereof, thereby decreasing the amount of data to be transmitted.

In some embodiments, the end-of-transmission identifier includes a regional end-of-transmission identifier AS and an entire frame end-of-transmission identifier VBP. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

Each of the data stream format in Table 2 and the end-of-transmission data stream may have an end-of-transmission identifier bit for the regional end-of-transmission identifier AS. Each of the data stream formats shown in Tables 1 and 2 and the end-of-transmission data stream for the last dynamic region may have an end-of-transmission identifier bit for the entire frame end-of-transmission identifier VBP. For example, 1 in the signal bit indicates that the transmission is finished. The present disclosure does not limit the position of the end-of-transmission identifier bit.

In some embodiments, during the reception of the data streams for the $t^{th}$ frame of image, it may be detected whether the signal in the end-of-transmission identifier bit is an end-of-transmission identifier (e.g., 1 or not). If the end-of-transmission identifier is detected, it is determined that the transmission is finished; and the refreshing is performed according to the pre-determined refresh mode and the refresh timing at step S33.

Figure 5:
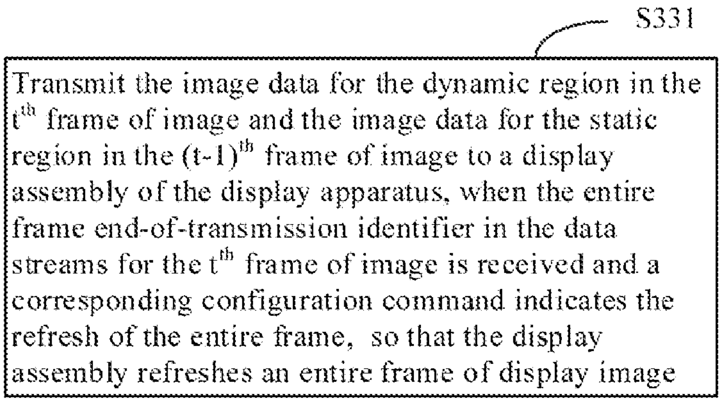
FIG. 5 is a flowchart of a part of steps of a display control method according to an embodiment of the present disclosure.

FIG. 5 is a flowchart of a part of steps of a display control method according to an embodiment of the present disclosure. As shown in FIG. 5, in some embodiments, step S33 may include step S331.

At step S331, when the entire frame end-of-transmission identifier in the data streams for the $t^{th}$ frame of image is received and a corresponding configuration command indicates the refresh of the entire frame, the image data for the dynamic region in the $t^{th}$ frame of image and the image data for the static region in the $(t-1)^{th}$ frame of image are transmitted to a display assembly of the display apparatus, so that the display assembly refreshes an entire frame of display image.

That is, the refresh mode in the configuration command is refreshing each of the dynamic region and the static region based on a time axis of the entire frame end-of-transmission identifiers VBP of the frames. In this case, after the entire frame end-of-transmission identifier VBP (e.g., the end-of-transmission identifier bit of VBP is 1) is received, the image data for the dynamic region in the $t^{th}$ frame of image may be transmitted to the display assembly according to the refresh timing in the configuration command; and the image data for the static region in the $(t-1)^{th}$ frame of image is called from the buffer space and transmitted to the display assembly, so that the display assembly refreshes the entire frame of display image for realizing the refreshing of the entire frame. The refresh timing may be synchronized with the timing when the VBP is received or after the timing when the VBP is received, which is not limited in the present disclosure.

Figure 6A:
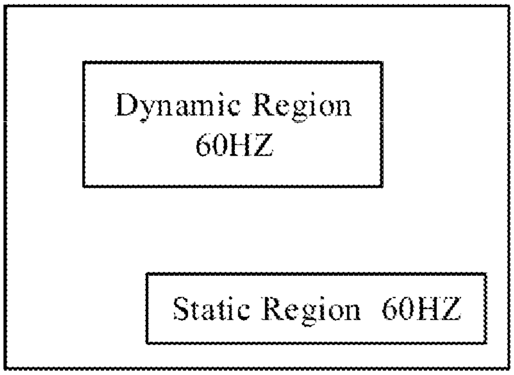
FIGS. 6*a*, 6*b*, 6*c*, and 6*d* are schematic diagrams showing a refresh of a display image according to an embodiment of the present disclosure.

FIG. 6*a* is a diagram showing a refresh of a display image according to an embodiment of the present disclosure. As shown in FIG. 6*a*, in the case where each of the dynamic region and the static region are refreshed on the basis of the time axis of the entire frame end-of-transmission identifier VBP for each frame of image, the refresh rate of each of the dynamic region and the static region is 60 HZ.

In this way, the amount of data to be transmitted can be decreased.

Figure 7:
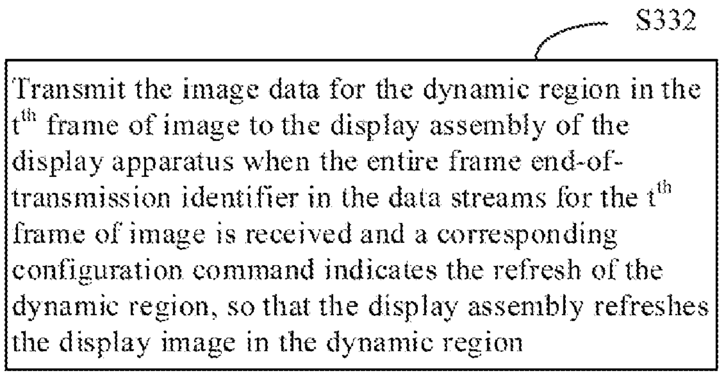
FIG. 7 is a flowchart of a part of steps of a display control method according to an embodiment of the present disclosure.

FIG. 7 is a flowchart of a part of steps of a display control method according to an embodiment of the present disclosure. As shown in FIG. 7, in some embodiments, step S33 may include steps S332.

At step S332, when the entire frame end-of-transmission identifier in the data streams for the $t^{th}$ frame of image is received and a corresponding configuration command indicates the refresh of the dynamic region, the image data for the dynamic region in the $t^{th}$ frame of image is transmitted to the display assembly of the display apparatus, so that the display assembly refreshes the display image in the dynamic region.

That is, the refresh mode in the configuration command is refreshing the dynamic region based on the entire frame end-of-transmission identifier of each of the frames; while the static region is not refreshed in the regional transmission format so that the display assembly performs the continuous display through the holding circuit of the display panel.

In this case, after the entire frame end-of-transmission identifier VBP (e.g., the end-of-transmission identifier bit of the VBP is 1) is received, the image data for the dynamic region in the $t^{th}$ frame of image is transmitted to the display assembly according to the refresh timing in the configuration command, so that the display assembly refreshes the display image in the dynamic region for implementing the regional refresh. The refresh timing may be synchronized with the timing when the VBP is received or after the timing when the VBP is received, which is not limited in the present disclosure.

In this way, the amount of data to be transmitted can be decreased, and the power consumption of the display apparatus can be reduced.

In some embodiments, the display control method according to an embodiment of the present disclosure may further include:

Determining the data for the entire frame of image for the $t^{th}$ frame of image from the multiple image data streams for the $t^{th}$ frame of image, when the data transmission format of the $t^{th}$ frame of image is an entire frame transmission format; and Transmitting the data for the entire frame of image for the $t^{th}$ frame of image to the display assembly of the display apparatus so that the display assembly refreshes an entire frame of display image, in the case where the entire frame end-of-transmission identifier in the data streams for the $t^{th}$ frame of image is received and a corresponding configuration command indicates the refresh of the entire frame.

That is, for the static region, the refresh mode in the configuration command is refreshing the static region based on the entire frame end-of-transmission identifier VBP in the entire frame transmission format. For the $t^{th}$ frame of image, if it is determined at step S31 that the data transmission format of the $t^{th}$ frame of image is the entire frame transmission format, the multiple image data streams have the format shown in Table 1; and the data for the entire frame of image for the $t^{th}$ frame of image is determined according to the received multiple image data streams for the $t^{th}$ frame of image.

In some embodiments, after the entire frame end-of-transmission identifier VBP (e.g., the end-of-transmission identifier bit of the VBP is 1) under the entire frame transmission format is received, the data for the entire frame of image for the $t^{th}$ frame of image is transmitted to the display assembly according to the refresh timing in the configuration command, so that the display assembly refreshes the entire frame of display image for implementing the refresh of the entire frame. The refresh timing may be synchronized with the timing when the VBP is received or after the timing when the VBP is received, which is not limited in the present disclosure.

Figure 6B:
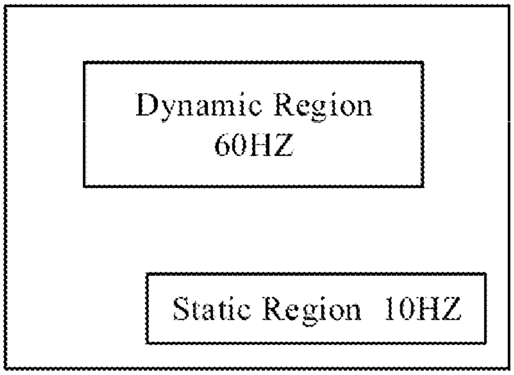

FIG. 6*b* is a diagram showing the refresh of the display image according to an embodiment of the present disclosure. As shown in FIG. 6*b*, in the case where the dynamic region is refreshed based on the entire frame end-of-transmission identifier VBP for each frame, and the static region is refreshed based on the entire frame end-of-transmission identifier VBP in the entire frame transmission format, the refresh rate of the dynamic region is 60 HZ, and the refresh rate of the static region is decreased to 10 HZ.

In this way, the amount of data to be transmitted can be decreased, and the power consumption of the display apparatus can be greatly reduced by decreasing the refresh rate of the static region.

Figure 8:
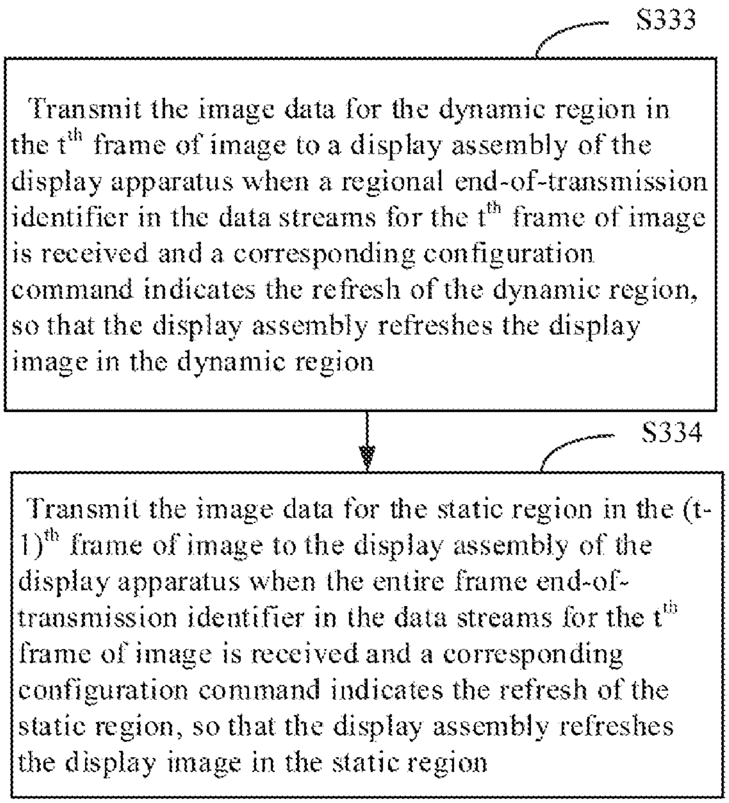
FIG. 8 is a flowchart of a part of steps of a display control method according to an embodiment of the present disclosure.

FIG. 8 is a flowchart of a part of steps of a display control method according to an embodiment of the present disclosure. As shown in FIG. 8, in some embodiments, step S33 may include steps S333 and S334.

At step S333, when a regional end-of-transmission identifier in the data streams for the $t^{th}$ frame of image is received and a corresponding configuration command indicates the refresh of the dynamic region, the image data for the dynamic region in the $t^{th}$ frame of image is transmitted to a display assembly of the display apparatus, so that the display assembly refreshes the display image in the dynamic region.

At step S334, when the entire frame end-of-transmission identifier in the data streams for the $t^{th}$ frame of image is received and a corresponding configuration command indicates the refresh of the static region, the image data for the static region in the $(t-1)^{th}$ frame of image is transmitted to the display assembly of the display apparatus, so that the display assembly refreshes the display image in the static region.

The multiple image data streams for the $t^{th}$ frame of image include at least one regional end-of-transmission identifier.

That is, the refresh mode in the configuration command is refreshing the dynamic region based on the regional end-of-transmission identifier AS, and refreshing the static region based on the entire frame end-of-transmission identifier VBP of each frame.

In some embodiments, since only the image data for the dynamic region is transmitted on the physical lines, the amount of the transmitted data is relatively small, so that the image data for the dynamic region can be transmitted multiple times during a time period corresponding to the $t^{th}$ frame of image, and a regional end-of-transmission identifier AS (e.g., the end-of-transmission identifier bit of the AS is 1) is transmitted after the transmission of the image data for each of the dynamic regions is finished, so that the multiple image data streams for the $t^{th}$ frame of image include at least one regional end-of-transmission identifier.

In some embodiments, after the regional end-of-transmission identifier AS is receive, the image data for the dynamic region in the $t^{th}$ frame of image may be transmitted to the display assembly according to the refresh timing in the configuration command, so that the display assembly refreshes the display image in the dynamic region, thereby implementing high-speed refresh of the dynamic region.

In some embodiments, after the entire frame end-of-transmission identifier VBP of the $t^{th}$ frame of image is received, the image data for the static region in the $(t-1)^{th}$ frame of image is called from the buffer space and transmitted to the display assembly according to the refresh timing in the configuration command, so that the display assembly refreshes the display image in the static region, thereby implementing the normal refresh of the static region.

Figure 6C:
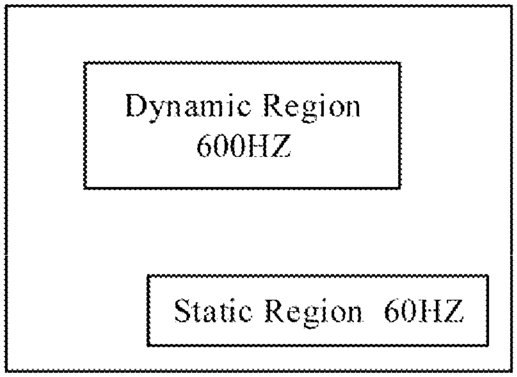

FIG. 6*c* is a diagram showing a refreshing of a display image according to an embodiment of the present disclosure. As shown in FIG. 6*c*, in the case that the dynamic region is refreshed based on the regional end-of-transmission identifier AS and the static region is refreshed based on the entire frame end-of-transmission identifier VBP for each frame, the refresh rate of the dynamic region may reach 600 HZ and the refresh rate of the static region may be maintained at 60 HZ.

In this way, the refresh rate of the dynamic region can be significantly improved without increasing the amount of data to be transmitted, and regional high frequency refresh can be realized, and the display effect can be improved.

Figure 9:
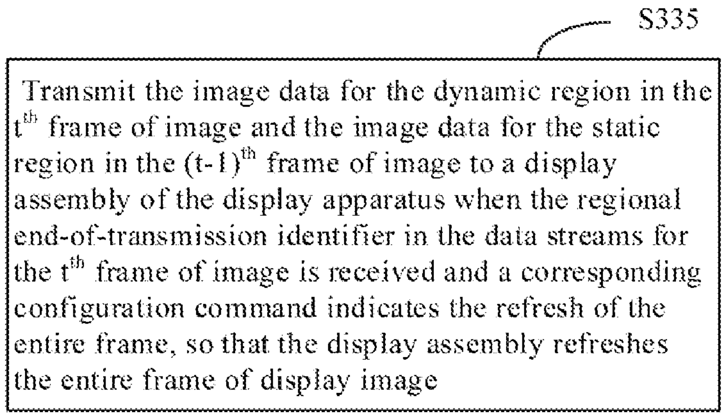
FIG. 9 is a flowchart of a part of steps of a display control method according to an embodiment of the present disclosure.

FIG. 9 is a flowchart of a part of steps of a display control method according to an embodiment of the present disclosure. As shown in FIG. 9, in some embodiments, step S33 may include steps S335.

At step S335, in a case that the regional end-of-transmission identifier in the data streams for the $t^{th}$ frame of image is received and a corresponding configuration command indicates the refresh of the entire frame, the image data for the dynamic region in the $t^{th}$ frame of image and the image data for the static region in the $(t-1)^{th}$ frame of image are transmitted to a display assembly of the display apparatus, so that the display assembly refreshes the entire frame of display image.

The multiple image data streams for the $t^{th}$ frame of image includes at least one regional end-of-transmission identifier.

That is, the refresh mode in the configuration command is refreshing each of the dynamic region and the static region based on the regional end-of-transmission identifier AS. In this case, similarly, the image data for the dynamic region may be transmitted multiple times during a time period corresponding to the $t^{th}$ frame of image, and the regional end-of-transmission identifier AS is transmitted after the transmission of the image data for each of the dynamic regions is finished, so that the multiple image data streams for the $t^{th}$ frame of image includes at least one regional end-of-transmission identifier.

In some embodiments, after the regional end-of-transmission identifier AS is received, the image data for the dynamic region in the $t^{th}$ frame of image may be transmitted to the display assembly according to the refresh timing in the configuration command, and the image data for the static region in the $(t-1)^{th}$ frame of image is called from the buffer space and transmitted to the display assembly, so that the display assembly refreshes the entire frame of the display image of, thereby implementing high-speed refresh of the entire frame.

Figure 6D:
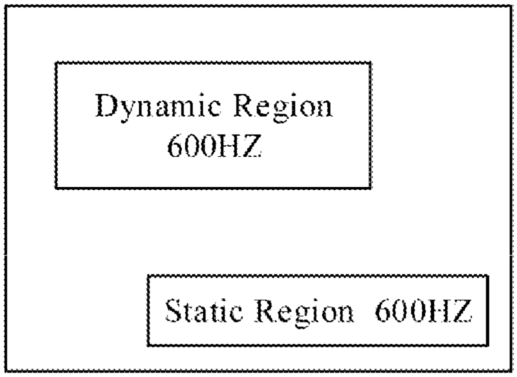

FIG. 6*d* is a diagram showing a refresh of a display image according to an embodiment of the present disclosure. As shown in FIG. 6*d*, in the case that each of the dynamic region and the static region is refreshed based on the regional end-of-transmission identifier AS, the refresh rate of the entire frame reaches 600 HZ.

In this way, the refresh rate of the entire frame can be significantly improved without increasing the amount of data to be transmitted, the global refresh with low power consumption and high frequency can be realized, the display difference of the dynamic region and the static region due to the inconsistency of the refresh rates of the dynamic region and the static region can be reduced, and the display effect can be further improved.

In some embodiments, the display control method according to an embodiment of the present disclosure may further include:

Refreshing the image data for the dynamic region in the $(t-1)^{th}$ frame of image in the buffer space based on the image data for the dynamic region in the $t^{th}$ frame of image, so that the data for the entire frame of image for the $t^{th}$ frame of image is cached in the buffer space.

That is, after the dynamic region and the image data of the dynamic region in the $t^{th}$ frame of image are determined at step S32, the image data for the dynamic region in the $(t-1)^{th}$ frame of image in the buffer space may be refreshed according to the image data for the dynamic region in the $t^{th}$ frame of image; and the refreshed data for the entire frame of image serves as the data for the entire frame of image for the $t^{th}$ frame of image. As such, when the image data for the $(t+1)^{th}$ frame is transmitted by adopting the regional transmission format, the image data for the static region in the $t^{th}$ frame of image in the buffer space may be directly called.

In this way, local refreshing of the buffer space can be realized, which facilitates data transmission and display image refreshing for the next frame, and display control of multi-frame image can be realized.

According to an embodiment of the present disclosure, a display control method is provided, which is applied to the image processing device of the display apparatus, which is a transmission terminal for transmitting the display data, for example, a GPU or other types of components, and the present disclosure is not limited thereto.

Figure 10:
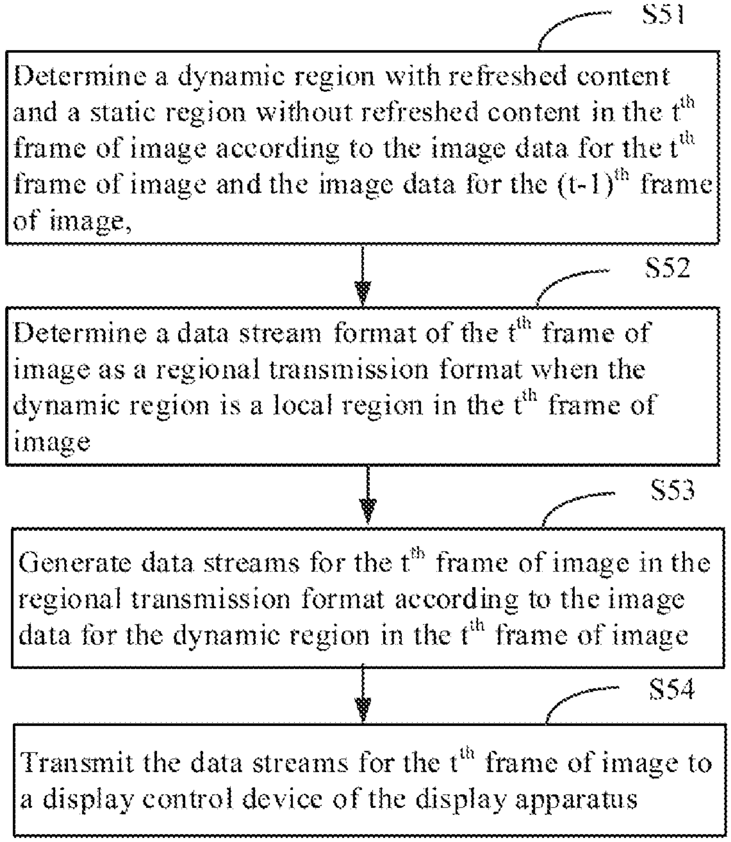
FIG. 10 is a flowchart of a display control method according to an embodiment of the present disclosure.

FIG. 10 is a flowchart of a display control method according to an embodiment of the present disclosure. As shown in FIG. 10, in some embodiments, the method includes steps S51 to S54.

At step S51, according to the image data for the $t^{th}$ frame of image and the image data for the $(t-1)^{th}$ frame of image, a dynamic region with refreshed content and a static region without refreshed content in the $t^{th}$ frame of image are determined, wherein t is an integer larger than 1.

At step S52, it is determined that a data stream format of the $t^{th}$ frame of image is a regional transmission format when the dynamic region is a local region in the $t^{th}$ frame of image. The data stream format includes an entire frame transmission format and a regional transmission format. The entire frame transmission format is used for transmitting data for the entire frame of image, and the regional transmission format is used for transmitting image data for the dynamic region.

At step S53, data streams for the $t^{th}$ frame of image are generated in the regional transmission format according to the image data for the dynamic region in the $t^{th}$ frame of image.

At step S54, the data streams for the $t^{th}$ frame of image are transmitted to a display control device of the display apparatus, so that the display control device controls a display assembly of the display apparatus to display the $t^{th}$ frame of image.

For example, the image processing device may render the $t^{th}$ frame of image to be displayed, and during the rendering of the $t^{th}$ frame of image, the image data for the $t^{th}$ frame of image is compared with the image data for the $(t-1)^{th}$ frame of image at step S51, so as to determine a dynamic region with refreshed content and a static region without refreshed content in the $t^{th}$ frame of image.

In some embodiments, at step S52, if a dynamic region exists in the $t^{th}$ frame of image and the dynamic region is a local region in the $t^{th}$ frame of image, the data stream format of the $t^{th}$ frame of image may be determined to be a regional transmission format, that is, only the image data for the dynamic region is transmitted.

In some embodiments, at step S53, the data streams for the $t^{th}$ frame of image may be generated in a regional transmission format according to the image data for the dynamic region in the $t^{th}$ frame of image. That is, the data streams are generated in the data structure shown in FIG. 2, and each of image data streams adopts the data format in Table 2.

In some embodiments, at step S54, the data streams for the $t^{th}$ frame of image may be sequentially transmitted to the display control device, so that the display control device controls the display assembly to display the $t^{th}$ frame of image in a regional refresh manner or an entire frame refresh manner based on the refresh mode and the refresh timing in the configuration command.

According to the embodiment of the present disclosure, the dynamic region with refreshed content in the image is determined; the data streams of image data of only dynamic region are generated in the regional transmission format and transmitted to the display control device, so as to reduce the amount of data to be transmitted and the power consumption of the display device at the normal refresh rate, or increase the refresh rate without increasing the amount of data to be transmitted The display control method according to an embodiment of the present disclosure will be illustrated below.

As described above, the image processing device may compare at step S51 the image data for the $t^{th}$ frame of image with the image data for the $(t-1)^{th}$ frame of image to determine a dynamic region with refreshed content and a static region without refreshed content in the $t^{th}$ frame of image; and determines that the data stream format of the $t^{th}$ frame of image as a regional transmission format when the dynamic region is the local region in the $t^{th}$ frame of image. Further, at step S53, the data streams for the $t^{th}$ frame of image are generated.

Figure 11:
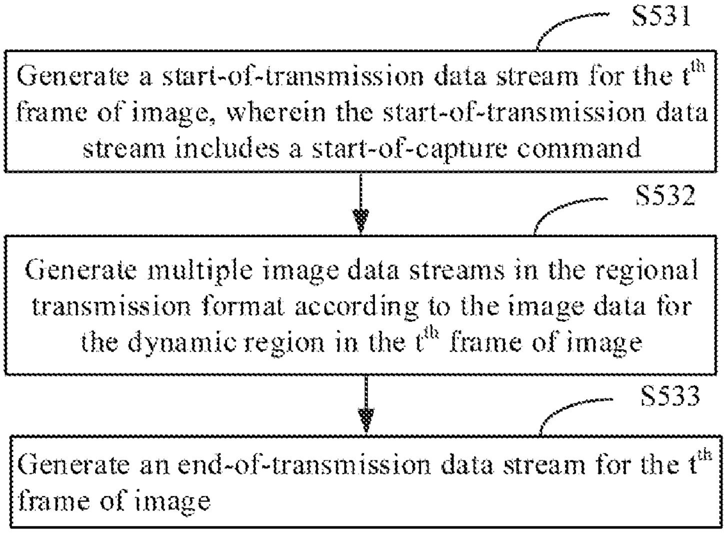
FIG. 11 is a flowchart of a part of steps of a display control method according to an embodiment of the present disclosure.

FIG. 11 is a flowchart of a part of steps of a display control method according to an embodiment of the present disclosure. As shown in FIG. 11, in some embodiments, step S53 may include steps S531 to S533.

At step S531, a start-of-transmission data stream for the $t^{th}$ frame of image is generated. The start-of-transmission data stream includes a start-of-capture command, and the start-of-capture command includes initial coordinates and a size of the dynamic region in the $t^{th}$ frame of image. The start-of-capture command is used for instructing the display control device to determine the position of the dynamic region and instructing the display control device to start capturing image data in the data streams.

At step S532, multiple image data streams are generated in the regional transmission format, according to the image data for the dynamic region in the $t^{th}$ frame of image.

At step S533, an end-of-transmission data stream for the $t^{th}$ frame of image is generated. The end-of-transmission data stream includes an end-of-capture command, and the end-of-capture command is used for instructing the display control device to stop capturing image data in the data streams and to determine the captured image data as the image data for the dynamic region in the $t^{th}$ frame of image.

For example, after the transmission of the previous frame (i.e., the $(t-1)^{th}$ frame) is completed, the image processing device may generate a blank region data stream (V-Blank, VBE), as a data adjustment region between frames, before the data streams for the $t^{th}$ frame of image. The filling of blank data and the configuration of the next frame (i.e., the $t^{th}$ frame) can be implemented by the blank region data stream. After V-Blank is finished, TX (transmitting data) and RX (receiving data) synchronization signals may be transmitted to achieve synchronization of transmission and reception between the image processing device and the display control device.

In some embodiments, the image processing device may generate the data streams for the $t^{th}$ frame of image in the regional transmission format according to the data structure in FIG. 2. At step S531, a start-of-transmission data stream (HBS, VSC Star, HBE) of the $t^{th}$ frame of image may be generated, and the start-of-transmission data stream includes a start-of-capture command VSC Star. The start-of-capture command VSC Star includes the initial coordinates and the size of the dynamic region in the $t^{th}$ frame of image therein. The start-of-capture command is used for instructing the display control device to determine the position of the dynamic region, and instructing the display control device to capture the image data from the multiple image data streams (e.g., HBS, HBE, Data Line 1; HBS, HBE, Data Line 2) after the start-of-capture command. The multiple image data streams may also include the start-of-transmission data stream itself, such as HBS, VSC Star, HBE, Data Line k in FIG. 2.

In some embodiments, at step S532, the multiple image data streams, such as HBS, HBE, Data Line 1, HBS, HBE, Data Line 2, etc., may be generated in a regional transmission format based on the image data for the dynamic region in the $t^{th}$ frame of image.

In some embodiments, after the image data streams of the image data for the dynamic region are generated, an end-of-transmission data stream (HBS, VSC End, HBE, AS; HBS, VSC CRC) of the $t^{th}$ frame of image may be generated. The end-of-transmission data stream includes an end-of-capture command VSC End for instructing the display control device to stop capturing the image data in the data streams and determine the captured image data as the image data for the dynamic region in the $t^{th}$ frame of image.

The end-of-transmission data stream may further include a row of check data stream including a cyclic redundancy check signal VSC CRC for determining if any error exists in the reception of the RX signal.

In some embodiments, if multiple dynamic regions exist in the image, the above steps S531 to S533 may be repeated for multiple times until data streams for all dynamic regions are generated. As shown in FIG. 2, if the multiple dynamic regions exist in the image, the data streams (HBS, VSC Star, HBE, Data Line k; etc.) for the second dynamic region may be generated after the data streams for the first dynamic region are generated In this way, the generation process of the data stream can be realized, and the amount of the data to be transmitted can be decreased.

In some embodiments, the data streams for the $t^{th}$ frame of image include an end-of-transmission identifier. The end-of-transmission identifier includes a regional end-of-transmission identifier and an entire frame end-of-transmission identifier. The regional end-of-transmission identifier represents that the transmission of the image data for the dynamic region in the $t^{th}$ frame of image is finished, and the entire frame end-of-transmission identifier represents that the transmission of the image data for the $t^{th}$ frame of image is finished.

That is, the data streams include an end-of-transmission identifier, and the end-of-transmission identifier includes a regional end-of-transmission identifier AS and an entire frame end-of-transmission identifier VBP. The data stream format shown in Table 2 and the end-of-transmission data stream may both have an end-of-transmission identifier bit of the regional end-of-transmission identifier AS. The data stream formats shown in Tables 1 and 2 and the end-of-transmission data stream for the last dynamic region may each have an end-of-transmission identifier bit of the entire frame end-of-transmission identifier VBP. For example, 1 in the signal bit indicates that the transmission is finished. The present disclosure does not limit the position of the end-of-transmission identifier.

In some embodiments, when the data streams for the $t^{th}$ frame of image are generated, the regional end-of-transmission identifier AS and/or the entire frame end-of-transmission identifier VBP may be set in the data streams. That is, the signal bit of the regional end-of-transmission identifier AS and/or the entire frame end-of-transmission identifier VBP is set to be valid, so as to indicate that the transmission of the image data for the dynamic region in the $t^{th}$ frame of image is finished or indicate that the transmission of the image data for the $t^{th}$ frame of image is finished.

In some embodiments, the data streams for the $t^{th}$ frame of image include configuration command including a start-of-capture command and an end-of-capture command. The configuration command indicates the data stream format of the $t^{th}$ frame of image and instructs the display control device to control the display assembly to refresh the display image in the dynamic region and/or the display image in the static region in the $t^{th}$ frame of image.

That is, the refresh mode and the refresh timing may be set in the configuration command, so that the display control device transmits the image data for the dynamic region to the display assembly for realizing the refresh of the dynamic region: or transmits the image data for the static region in the $(t-1)^{th}$ frame of image to the display assembly for realizing the refreshing of the static region or the refreshing of the entire frame. The refresh mode and the refresh timing may be set according to the foregoing description, and will not be described herein again.

In this way, the flexibility of the refresh mode can be improved based on the settings of the regional end-of-transmission identifier, the entire frame end-of-transmission identifier and the configuration command.

In some embodiments, the data streams for the $t^{th}$ frame of image may be transmitted to the display control device at step S54. Specifically, the step S54 may include:

Transmitting the data streams for the $t^{th}$ frame of image to the display control device for multiple times during a time period corresponding to the $t^{th}$ frame of image.

For example, since only the image data for the dynamic region is transmitted on the physical lines, the amount of the data to be transmitted is relatively small, so that the image data for the dynamic region may be transmitted to the display control device for multiple times during the time period corresponding to the $t^{th}$ frame of image, and the regional end-of-transmission identifier AS (e.g., the end-of-transmission identifier bit of the AS is 1) is transmitted after the transmission of image date for each of the dynamic regions is finished, so that the multiple image data streams for the $t^{th}$ frame of image include multiple regional end-of-transmission identifiers.

In this way, after the display control device receives the regional end-of-transmission identifier AS, the display control device may transmit the image data for the dynamic region in the $t^{th}$ frame of image to the display assembly according to the refresh mode and the refresh timing in the configuration command, so that the display assembly refreshes the display image in the dynamic region for realizing the high-speed refreshing of the dynamic region: alternatively the display control device may simultaneously transmit the image data for the dynamic region and the image data for the static region in the $(t-1)^{th}$ frame of image in the buffer space to the display assembly, so that the display assembly refreshes the display image of the entire frame for realizing the high-speed refreshing of the entire frame.

In this way, the refresh rate of the entire frame can be significantly improved without increasing the amount of the data to be transmitted, and the local refresh with a high frequency and low power consumption or the global refresh with a high frequency can be realized.

According to the display control method in the embodiment of the present disclosure, the judgment of the refresh region can be performed on each frame of image, and only the image data for the dynamic region is transmitted, so that the amount of the data to be transmitted can be decreased, and the power consumption of the display apparatus under the normal refresh rate can be reduced.

According to the embodiment of the present disclosure, a data stream format of each row of image data stream and a regional end-of-transmission identifier AS (or an identifier beacon) are set in the data transmission protocol, so that the regional end-of-transmission identifier AS and an entire frame end-of-transmission identifier VBP can be controlled and used independently. Transmissions for image data for the dynamic region and the static region can be realized based on various refresh modes. The number of transmission of image data for dynamic region can be adjusted according to the size of data packet for the dynamic region, so that the end-of-transmission identifier can be output at a high speed on a limited bandwidth, high-frequency refreshing of a local region or synchronous high-frequency refreshing of an entire frame can be realized, and the refresh rate can be significantly improved without increasing the amount of data to be transmitted. In addition, the display difference caused by inconsistent refresh rates of the dynamic region and the static region can be reduced, and the display effect can be further improved.

Figure 12:
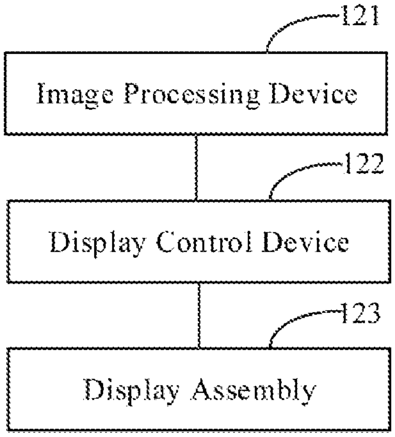
FIG. 12 is a block diagram of a display apparatus according to an embodiment of the present disclosure.

An embodiment of the present disclosure provides a display apparatus. FIG. 12 is a block diagram showing a display apparatus according to an embodiment of the present disclosure. As shown in FIG. 12, the display apparatus includes an image processing device 121, a display control device 122 and a display assembly 123.

The image processing device is connected to the display control device and configured to render a $t^{th}$ frame of image to be displayed, determine a dynamic region with refreshed content and a static region without refreshed content in the $t^{th}$ frame of image, generate data streams for the $t^{th}$ frame of image according to the dynamic region, and transmit the data streams to the display control device, wherein t is an integer greater than 1.

The display control device is connected to the display assembly and configured to for receive the data streams for the $t^{th}$ frame of image, determine the image data for the dynamic region in the $t^{th}$ frame of image, and transmit the image data for the dynamic region in the $t^{th}$ frame of image and/or the image data for the static region in the cached $(t-1)^{th}$ frame of image to the display assembly according to the end-of-transmission identifier and the configuration command in the data streams.

The display assembly is configured to refresh a display image according to the image data transmitted from the display control device.

Figure 13:
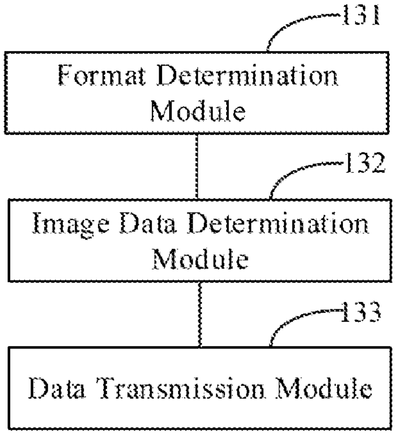
FIG. 13 is a block diagram of a display control device according to an embodiment of the present disclosure.

An embodiment of the present disclosure provides a display control device. FIG. 13 is a block diagram showing a display control device according to an embodiment of the present disclosure. As shown in FIG. 13, the display control device includes a format determination module 131, an image data determination module 132, and a data transmission module 133.

The format determination module 131 is configured to determine a data stream format of a $t^{th}$ frame of image, according to received data streams for the $t^{th}$ frame of image. The data stream format includes an entire frame transmission format and a regional transmission format. The entire frame transmission format is used for transmitting data for entire frame of image, and the regional transmission format is used for transmitting image data for a dynamic region with refreshed content, wherein t is an integer greater than 1.

The image data determination module 132 is configured to determine a dynamic region and image data for the dynamic region in the $t^{th}$ frame of image from the received data streams for the $t^{th}$ frame of image, when the data stream format of the $t^{th}$ frame of image is the regional transmission format. The $t^{th}$ frame of image further includes a static region in addition to the dynamic region.

The data transmission module 133 is configured to transmit image data for a dynamic region in the $t^{th}$ frame of image and/or image data for a $(t-1)^{th}$ frame of image in a buffer space of the display control device to a display assembly of the display apparatus, according to an end-of-transmission identifier in the data streams for the $t^{th}$ frame of image and a configuration command of the $t^{th}$ frame of image, so that the display assembly refreshes a display image.

In some embodiments, the end-of-transmission identifier includes a regional end-of-transmission identifier and an entire frame end-of-transmission identifier. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

The data transmission module 133 is configured to transmit image data for the dynamic region in the $t^{th}$ frame of image and image data for the static region in the $(t-1)^{th}$ frame of image to a display assembly of the display apparatus when the entire frame end-of-transmission identifier in the data streams for the $t^{th}$ frame of image is received and a corresponding configuration command indicates the refresh of the entire frame, so that the display assembly refreshes the entire frame of display image.

In some embodiments, the end-of-transmission identifier includes a regional end-of-transmission identifier and an entire frame end-of-transmission identifier. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

The data transmission module 133 is configured to transmit the image data for the dynamic region in the $t^{th}$ frame of image to a display assembly of the display apparatus when the entire frame end-of-transmission identifier in the data streams for the $t^{th}$ frame of image is received and a corresponding configuration command indicates the refresh of the dynamic region, so that the display assembly refreshes the display image in the dynamic region.

In some embodiments, the display control device further includes: a determination module configured to determine the data for the entire frame of image for the $t^{th}$ frame of image from the received multiple image data streams for the $t^{th}$ frame of image when the data transmission format of the $t^{th}$ frame of image is the entire frame transmission format; and a transmission module configured to transmit the data for the entire frame of image for the $t^{th}$ frame of image to a display assembly of the display apparatus when the entire frame end-of-transmission identifier in the data streams for the $t^{th}$ frame of image is received and a corresponding configuration command indicates the refresh of the entire frame, so that the display assembly refreshes the entire frame of display image.

In some embodiments, the end-of-transmission identifier includes a regional end-of-transmission identifier and an entire frame end-of-transmission identifier. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

The data transmission module 133 is configured to transmit the image data for the dynamic region in the $t^{th}$ frame of image to a display assembly of the display apparatus when the regional end-of-transmission identifier in the data streams for the $t^{th}$ frame of image is received and a corresponding configuration command indicates the refresh of the dynamic region, so that the display assembly refreshes the display image in the dynamic region; and transmit the image data for the static region in the $(t-1)^{th}$ frame of image to the display assembly of the display apparatus when the entire frame end-of-transmission identifier in the data streams for the $t^{th}$ frame of image is received and a corresponding configuration command indicates the refresh of the static region, so that the display assembly refreshes the display image in the static region. The multiple image data streams for the $t^{th}$ frame of image include at least one regional end-of-transmission identifier.

In some embodiments, the end-of-transmission identifier includes a regional end-of-transmission identifier and an entire frame end-of-transmission identifier. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

The data transmission module 133 is configured to: transmit the image data for the dynamic region in the $t^{th}$ frame of image and the image data for the static region in the $(t-1)^{th}$ frame of image to the display assembly of the display apparatus when the regional end-of-transmission identifier in the data streams for the $t^{th}$ frame of image is received and a corresponding configuration command indicates the refresh of the entire frame, so that the display assembly refreshes an entire frame of display image. The multiple image data streams for the $t^{th}$ frame of image include at least one regional end-of-transmission identifier.

In some embodiments, the image data determination module 132 is configured to: determine the initial coordinates and the size of the dynamic region in the $t^{th}$ frame of image according to the start-of-capture command in the data streams for the $t^{th}$ frame of image; capturing the image data from the multiple image data streams following the start-of-capture command in response to the start-of-capture command; and determine the captured image data as the image data for the dynamic region in the $t^{th}$ frame of image in response to the end-of-capture command in the data streams for the $t^{th}$ frame of image.

In some embodiments, the display control device further includes a data refreshing module configured to refresh the image data for the dynamic region in the $(t-1)^{th}$ frame of image in the buffer space based on the image data for the dynamic region in the $t^{th}$ frame of image, so that the data for the entire frame of image for the $t^{th}$ frame of image is cached in the buffer space.

Figure 14:
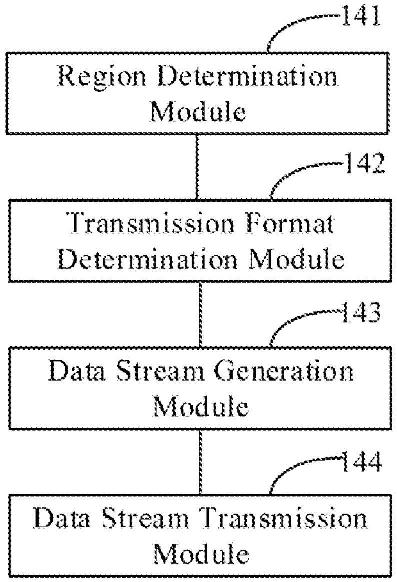
FIG. 14 is a block diagram showing an image processing device according to an embodiment of the present disclosure.

An embodiment of the present disclosure provides an image processing device. FIG. 14 is a block diagram showing an image processing device according to an embodiment of the present disclosure. As shown in FIG. 14, the image processing device includes a region determination module 141, a transmission format determination module 142, a data stream generation module 143, and a data stream transmission module 144.

The region determination module 141 is configured to determine a dynamic region with refreshed content and a static region without refreshed content in a $t^{th}$ frame of image according to image data for a rendered $t^{th}$ frame of image and image data for a $(t-1)^{th}$ frame of image, where t is an integer greater than 1.

The transmission format determination module 142 is configured to determine that a data stream format of the $t^{th}$ frame of image is a regional transmission format when the dynamic region is a local region in the $t^{th}$ frame of image. The data stream format includes an entire frame transmission format and a regional transmission format. The entire frame transmission format is used for transmitting data for the entire frame of image, and the regional transmission format is used for transmitting image data for the dynamic region.

The data stream generation module 143 is configured to generate data streams for the $t^{th}$ frame of image in the regional transmission format according to the image data for the dynamic region in the $t^{th}$ frame of image.

The data stream transmission module 144 is configured to transmit the data streams for the $t^{th}$ frame of image to a display control device of a display apparatus, so that the display control device controls a display assembly of the display apparatus to display the $t^{th}$ frame of image.

In some embodiments, the data stream generation module 143 is configured to generate a start-of-transmission data stream for the $t^{th}$ frame of image, wherein the start-of-transmission data stream includes a start-of-capture command, the start-of-capture command includes initial coordinates and a size of a dynamic region in the $t^{th}$ frame of image, and the display control device determines a position of the dynamic region and starts capturing image data in the data streams according to the start-of-capture command: generate multiple image data streams in the regional transmission format according to the image data for the dynamic region in the $t^{th}$ frame of image; and generate an end-of-transmission data stream for the $t^{th}$ frame of image, wherein the end-of-transmission data stream includes an end-of-capture command, and the display control device stops capturing the image data in the data streams according to the end-of-capture command and determines the captured image data as the image data for the dynamic region in the $t^{th}$ frame of image.

In some embodiments, the data stream transmission module 144 is configured to transmit the data streams for the $t^{th}$ frame of image to the display control device for multiple times or many times during a time period corresponding to the $t^{th}$ frame of image.

In some embodiments, the data streams for the $t^{th}$ frame of image include an end-of-transmission identifier. The end-of-transmission identifier includes a regional end-of-transmission identifier and an entire frame end-of-transmission identifier. The regional end-of-transmission identifier indicates that the transmission of the image data for the dynamic region in the $t^{th}$ frame of image is finished, and the entire frame end-of-transmission identifier indicates that the transmission of the image data for the $t^{th}$ frame of image is finished.

The data streams for the $t^{th}$ frame of image include a configuration command, which includes a start-of-capture command and an end-of-capture command. The configuration command indicates a data stream format of the $t^{th}$ frame of image; and the display control device controls the display assembly to refresh the display image for the dynamic region and/or the display image for the static region in the $t^{th}$ frame of image according to the configuration command.

In some embodiments, the image processing device includes a graphics processing unit GPU, and the display control device includes a timing controller Tcon.

Figure 15:
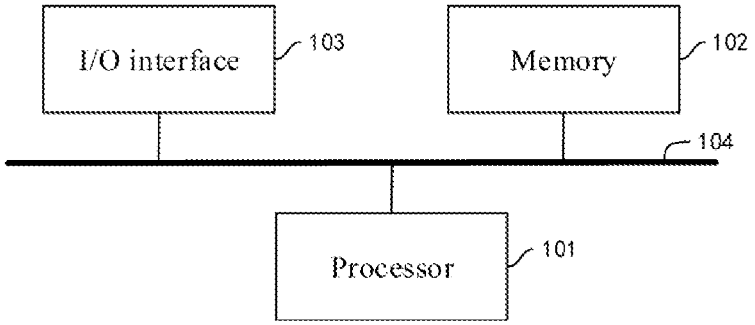

FIG. 15 is a schematic diagram showing a structure of an electronic device according to an embodiment of the present disclosure. As shown in FIG. 15, an embodiment of the present disclosure provides an electronic device including: processor(s) 101, a memory 102, I/O interface(s) 103. The memory 102 stores program(s) that, when executed by the processor(s), cause(s) the processor(s) to implement the display control method as in any of the above embodiments. I/O interface(s) 103 are coupled between the processor and the memory and enables information interaction between the processor and the memory.

The processor 101 is a device with data processing capability, which includes but is not limited to, a Central Processing Unit (CPU), etc. The memory 102 is a device having data storage capabilities, which includes but not limited to, Random Access Memory (RAM, more specifically SDRAM, DDR, etc.), Read Only Memory (ROM), Electrically Erasable Programmable Read Only Memory (EEPROM), FLASH memory (FLASH). The I/O interface (i.e., a read-write interface) 103 is connected between the processor 101 and the memory 102, enables the information interaction between the processor 101 and the memory 102, and includes but is not limited to a Data Bus (Bus) and the like.

In some embodiments, the processor 101, memory 102, and I/O interface 103 are connected together via the bus 104, which in turn are connected to other components of the computing device.

In some embodiments, the processor(s) 101 include a graphics processing unit GPU, or a timing controller Tcon.

An embodiment of the present disclosure provides a computer-readable medium. The computer readable medium has a computer program stored thereon, wherein the program, when executed by a processor, implements the steps in the image display control method according to any one of the above embodiments.

In particular, according to embodiments of the present disclosure, the processes described above with reference to the flow diagrams may be implemented as computer software programs. For example, an embodiment of the present disclosure provides a computer program product having a computer program embodied on a machine-readable medium, the computer program includes program codes for performing the method shown in the flow chart. In such an embodiment, the computer program may be downloaded from a network via the communication section and installed, and/or installed from a removable medium. The above-described functions in the system of the present disclosure are performed when the computer program is executed by a Central Processing Unit (CPU).

It should be noted that the computer readable medium in the present disclosure may be a computer readable signal medium or a computer readable storage medium or any combination of the two. A computer readable storage medium may be, for example, but not limited to, anyone or a combination of an electronic, magnetic, optical, electromagnetic, infrared, or semiconductor system, apparatus, or device. More specific examples of the computer readable storage medium may include but are not limited to: anyone or a combination of an electrical connection having one or more wires, a portable computer diskette, a hard disk, a Random Access Memory (RAM), a Read-Only Memory (ROM), an Erasable Programmable Read-Only Memory (EPROM or flash memory), an optical fiber, a Portable Compact Disc Read-Only Memory (CD-ROM), an optical storage device, a magnetic storage device. In the present disclosure, a computer readable storage medium may be any tangible medium that includes or stores a program for use by or in connection with an command execution system, apparatus, or device. In contrast, in the present disclosure, a computer-readable signal medium may include a data signal with computer-readable program code embodied therein, for example, propagated in baseband or as part of a carrier wave. Such a propagated data signal may be in various forms, including but not limited to, electro-magnetic, optical, or any suitable combination thereof. A computer readable signal medium may be any computer readable medium in addition to a computer readable storage medium that communicates, propagates, or transports a program for use by or in connection with a command execution system, apparatus, or device. Program codes embodied on a computer readable medium may be transmitted in any appropriate medium, including but not limited to, anyone or a combination of wireless, wires, fiber optic cables, RF, etc.

The flowchart and block diagrams in the drawings show the architecture, functionality, and operation of possible implementations of systems, methods and computer program products according to the embodiments of the present disclosure. In this regard, each block in the flowchart or block diagrams may represent a module, segment, or portion of code, which comprises one or more executable commands for implementing the specified logical function(s). It should also be noted that, in some alternative implementations, the functions in the block may be executed in an order different from the order shown in the figures. For example, two blocks shown in succession may, in fact, be executed substantially concurrently, or the blocks may sometimes be executed in the reverse order, depending upon the functionality involved. It will also be noted that each block or combinations of blocks of the block diagrams and/or flowchart can be implemented by special purpose hardware-based systems that perform the specified functions or acts, or combinations of special purpose hardware and computer commands.

The circuits or sub-circuits in the embodiments of the present disclosure may be implemented by software or hardware. The described circuits or sub-circuits may also be provided in a processor. For example, it may be described as: a processor, including a receiving circuit and a processing circuit, and the processing circuit includes a write sub-circuit and a read sub-circuit. The designation of the circuits or sub-circuits does not in some cases constitute a limitation of the circuit or sub-circuit itself. For example, the receiving circuit may also be designated as "receiving a video signal".

It will be understood that the above embodiments are merely exemplary embodiments to illustrate the principles of the present disclosure, and the present disclosure is not limited thereto. It will be apparent to those skilled in the art that various changes and modifications can be made therein without departing from the spirit and essence of the present disclosure, and these changes and modifications are to be considered within the scope of the present disclosure.

What is claimed is:

1. A display control method for a display control device of a display apparatus, comprising:

determining a data stream format of a $t^{th}$ frame of image according to received data streams for the $t^{th}$ frame of image, wherein the data stream format comprises an entire frame transmission format and a regional transmission format, the entire frame transmission format is used for transmitting data for entire frame of image, and the regional transmission format is used for transmitting image data for a dynamic region with refreshed content, t being an integer greater than 1;

determining the dynamic region and the image data for the dynamic region in the $t^{th}$ frame of image from the received data streams for the $t^{th}$ frame of image in response to that the data stream format of the $t^{th}$ frame of image is the regional transmission format, wherein the $t^{th}$ frame of image further comprises a static region in addition to the dynamic region; and transmitting the image data for the dynamic region in the $t^{th}$ frame of image and/or image data for a $(t-1)^{th}$ frame of image in a buffer space of the display control device to a display assembly of the display apparatus according to an end-of-transmission identifier in the data streams for the $t^{th}$ frame of image and a configuration command of the $t^{th}$ frame of image, so that the display assembly refreshes the display image, the regional transmission format comprises a plurality of pixel segments of the image data for the dynamic region, a plurality of regional end-of-transmission identifiers indicating that transmission of the image data for the dynamic region in the $t^{th}$ frame of image is finished, and an entire frame end-of-transmission identifier indicating that transmission of image data for the $t^{th}$ frame of image is finished, wherein each of the plurality of pixel segments is followed by a corresponding one of the plurality of regional end-of-transmission identifiers.

2. The display control method of claim 1, wherein transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, comprises:

transmitting the image data for the dynamic region in the $t^{th}$ frame of image and the image data for the static region in the $(t-1)^{th}$ frame of image in to the display assembly of the display apparatus in response to that the entire frame end-of-transmission identifier in the data streams for the $t^{th}$ frame of image is received and a corresponding configuration command indicates refresh of the entire frame of image, so that the display assembly refreshes an entire frame of display image.

3. The display control method of claim 1, transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, comprises:

transmitting the image data of the dynamic region in the $t^{th}$ frame of image to the display assembly of the display apparatus in response to that the entire frame end-of-transmission identifier in the data streams for the $t^{th}$ frame of image is received and a corresponding configuration command indicates refresh of the dynamic region, so that the display assembly refreshes the display image in the dynamic region.

4. The display control method of claim 3, further comprising:

determining the data for the entire frame of image for the $t^{th}$ frame of image from received multiple image data streams for the $t^{th}$ frame of image in response to that the data transmission format of the $t^{th}$ frame of image is the entire frame transmission format; and transmitting the data for the entire frame of image for the $t^{th}$ frame of image to the display assembly of the display apparatus in response to that the entire frame end-of-transmission identifier in the data streams for the $t^{th}$ frame of image is received and a corresponding configuration command indicates refresh of the entire frame of image, so that the display assembly refreshes an entire frame of display image.

5. The display control method of claim 1, transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, comprises:

transmitting the image data for the dynamic region in the $t^{th}$ frame of image to the display assembly of the display apparatus in response to that the regional end-of-transmission identifier in the data streams for the $t^{th}$ frame of image is received and a corresponding configuration command indicates refresh of the dynamic region, so that the display assembly refreshes the display image in the dynamic region; and transmitting the image data for the static region in the $(t-1)^{th}$ frame of image to the display assembly of the display apparatus in response to that the entire frame end-of-transmission identifier in the data streams for the $t^{th}$ frame of image is received and a corresponding configuration command indicates refresh of the static region, so that the display assembly refreshes the display image in the static region, wherein the multiple image data streams for the $t^{th}$ frame of image comprise at least one regional end-of-transmission identifier.

6. The display control method of claim 1, wherein transmitting the image data for the dynamic region in the $t^{th}$ frame of image and/or the image data for the $(t-1)^{th}$ frame of image in the buffer space of the display control device to the display assembly of the display apparatus according to the end-of-transmission identifier in the data streams for the $t^{th}$ frame of image and the configuration command of the $t^{th}$ frame of image, comprises:

transmitting the image data for the dynamic region in the $t^{th}$ frame of image and the image data for the static region in the $(t-1)^{th}$ frame of image to the display assembly of the display apparatus in response to that the regional end-of-transmission identifier in the data streams for the $t^{th}$ frame of image is received and a corresponding configuration command indicates refresh of the entire frame of image, so that the display assembly refreshes an entire frame of display image, wherein the multiple image data streams for the $t^{th}$ frame of image comprise at least one regional end-of-transmission identifier.

7. The display control method of claim 1, wherein determining the dynamic region and the image data for the dynamic region in the $t^{th}$ frame of image from the received data streams for the $t^{th}$ frame of image, comprises:

determining initial coordinates and a size of the dynamic region in the $t^{th}$ frame of image according to a start-of-capture command in the data streams for the $t^{th}$ frame of image;

capturing image data from multiple image data streams following the start-of-capture command in response to the start-of-capture command; and determining the captured image data as the image data for the dynamic region in the $t^{th}$ frame of image in response to an end-of-capture command in the data streams for the $t^{th}$ frame of image.

8. The display control method of claim 1, further comprising:

refreshing the image data for the dynamic region in the $(t-1)^{th}$ frame of image in the buffer space based on the image data for the dynamic region in the $t^{th}$ frame of image, so that data for the entire frame of image for the $t^{th}$ frame of image is cached in the buffer space.

9. An electronic device, comprising:

a processor;

a memory for storing one or more programs;

the one or more programs, which, when being run by the processor, is configured to cause the processor to perform the display control method of claim 1.

10. A non-transitory computer-readable storage medium, storing a computer program which, when being run by a processor of a controller, is configured to cause the processor to perform the display control method of claim 1.

11. A display control method for an image processing device of a display apparatus, the display control method comprising:

determining a dynamic region with refreshed content and a static region without refreshed content in a $t^{th}$ frame of image according to image data for the $t^{th}$ frame of image and image data for a $(t-1)^{th}$ frame of image, t being an integer larger than 1;

determining that a data stream format of the $t^{th}$ frame of image is a regional transmission format in response to that the dynamic region is a local region in the $t^{th}$ frame of image, wherein the data stream format comprises an entire frame transmission format and a regional transmission format, the entire frame transmission format is used for transmitting data for entire frame of image, and the regional transmission format is used for transmitting image data for the dynamic region;

generating data streams for the $t^{th}$ frame of image in the regional transmission format according to image data for the dynamic region in the $t^{th}$ frame of image; and transmitting the data streams for the $t^{th}$ frame of image to a display control device of the display apparatus, so that the display control device controls a display assembly of the display apparatus to display the $t^{th}$ frame of image, the regional transmission format comprises a plurality of pixel segments of the image data for the dynamic region, a plurality of regional end-of-transmission identifiers indicating that transmission of the image data for the dynamic region in the $t^{th}$ frame of image is finished, and an entire frame end-of-transmission identifier indicating that transmission of image data for the $t^{th}$ frame of image is finished, wherein each of the plurality of pixel segments is followed by a corresponding one of the plurality of regional end-of-transmission identifiers.

12. The display control method of claim 11, wherein generating the data streams for the $t^{th}$ frame of image in the regional transmission format according to the image data for the dynamic region in the $t^{th}$ frame of image, comprises:

generating a start-of-transmission data stream for the $t^{th}$ frame of image, wherein the start-of-transmission data stream comprises a start-of-capture command, and the start-of-capture command comprises initial coordinates and a size of the dynamic region in the $t^{th}$ frame of image; the display control device determines a position of the dynamic region and starts capturing image data in the data streams according to the start-of-capture command;

generating multiple image data streams in the regional transmission format according to the image data for the dynamic region in the $t^{th}$ frame of image; and generating an end-of-transmission data stream for the $t^{th}$ frame of image, wherein the end-of-transmission data stream comprises an end-of-capture command, and the display control device stops capturing the image data in the data streams and determines the captured image data as the image data for the dynamic region in the $t^{th}$ frame of image, according to the end-of-capture command.

13. The display control method of claim 12, wherein the data streams for the $t^{th}$ frame of image comprise a configuration command having a start-of-capture command and an end-of-capture command, the configuration command indicates a data stream format of the $t^{th}$ frame of image and instructs the display control device to control the display assembly to refresh a display image in the dynamic region and/or a display image in the static region in the $t^{th}$ frame of image.

14. The display control method of claim 11, wherein transmitting the data streams for the $t^{th}$ frame of image to the display control device of the display apparatus, comprises:

transmitting the data streams for the $t^{th}$ frame of image to the display control device for multiple times during a time period corresponding to the $t^{th}$ frame of image.

15. The display control method of claim 11, wherein the image processing device comprises a Graphics Processing Unit (GPU), and the display control device comprises a timing controller (Tcon).

16. A display apparatus comprising an image processing device, a display control device and a display assembly, wherein the image processing device is connected to the display control device and configured to render a $t^{th}$ frame of image to be displayed, determine a dynamic region with refreshed content and a static region without refreshed content in the $t^{th}$ frame of image, generate data streams for the $t^{th}$ frame of image according to the dynamic region, and transmit the data streams to the display control device, t being an integer greater than 1, the display control device is connected to the display assembly and configured to receive the data streams for the $t^{th}$ frame of image, determine image data for the dynamic region in the $t^{th}$ frame of image, and transmit the image data for the dynamic region in the $t^{th}$ frame of image and/or the cached image data for the static region in a $(t-1)^{th}$ frame of image to the display assembly according to an end-of-transmission identifier and a configuration command in the data streams, and the display assembly is configured to refresh a display image according to the image data transmitted by the display control device-, wherein the display control device comprises a format determination module, an image data determination module, and a data transmission module, wherein the format determination module is configured to determine a data stream format of a $t^{th}$ frame of image according to received data streams for the $t^{th}$ frame of image, wherein the data stream format comprises an entire frame transmission format and a regional transmission format, the entire frame transmission format is used for transmitting data for entire frame of image, and the regional transmission format is used for transmitting image data for a dynamic region with refreshed content, t being an integer larger than 1; the regional transmission format comprises a plurality of pixel segments of the image data for the dynamic region, a plurality of regional end-of-transmission identifiers indicating that transmission of the image data for the dynamic region in the $t^{th}$ frame of image is finished, and an entire frame end-of-transmission identifier indicating that transmission of image data for the $t^{th}$ frame of image is finished, wherein each of the plurality of pixel segments is followed by a corresponding one of the plurality of regional end-of-transmission identifiers, the image data determination module is configured to determine the dynamic region and image data for the dynamic region in the $t^{th}$ frame of image according to the received data streams for the $t^{th}$ frame of image in response to that the data stream format of the $t^{th}$ frame of image is the regional transmission format, where the $t^{th}$ frame of image further comprises a static region in addition to the dynamic region, and the data transmission module is configured to transmit the image data for the dynamic region in the $t^{th}$ frame of image and/or image data for a $(t-1)^{th}$ frame of image in a buffer space of the display control device to a display assembly of a display apparatus according to an end-of-transmission identifier in the data streams for the $t^{th}$ frame of image and a configuration command of the $t^{th}$ frame of image, so that the display assembly refreshes a display image.

17. The display apparatus of claim 16, wherein the image processing device comprises a region determination module, a transmission format determination module, a data stream generation module, and a data stream transmission module, wherein the region determination module is configured to determine a dynamic region with refreshed content and a static region without refreshed content in a $t^{th}$ frame of image according to a rendered image data for the $t^{th}$ frame of image and image data for a $(t-1)^{th}$ frame of image, t being an integer larger than 1, the transmission format determination module is configured to determine that a data stream format of the $t^{th}$ frame of image is a regional transmission format in response to that the dynamic region is a local region in the $t^{th}$ frame of image, wherein the data stream format comprises an entire frame transmission format and a regional transmission format, the entire frame transmission format is used for transmitting data for entire frame of image, and the regional transmission format is used for transmitting image data for the dynamic region;

the data stream generation module is configured to generate data streams for the $t^{th}$ frame of image in the regional transmission format according to the image data of the dynamic region in the $t^{th}$ frame of image; and the data stream transmission module is configured to transmit the data streams for the $t^{th}$ frame of image to a display control device of a display apparatus, so that the display control device controls a display assembly of the display apparatus to display the $t^{th}$ frame of image.

* * * * *